(12) United States Patent
Mullin et al.

(10) Patent No.: US 12,264,971 B2
(45) Date of Patent: Apr. 1, 2025

(54) NONCONTACT THERMOMETER

(71) Applicant: Welch Allyn, Inc., Skaneateles Falls, NY (US)

(72) Inventors: Matthew D. Mullin, Memphis, NY (US); Aaron R. Burnham, Skaneateles Falls, NY (US); Zhon Ye Chu, Skaneateles Falls, NY (US); David L. Kellner, Baldwinsville, NY (US); John A. Lane, Venice, FL (US); Carlos Andres Suarez, Syracuse, NY (US); Per Soderberg, Sarasota, FL (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 521 days.

(21) Appl. No.: 17/652,161

(22) Filed: Feb. 23, 2022

(65) Prior Publication Data

US 2022/0291045 A1    Sep. 15, 2022

Related U.S. Application Data

(60) Provisional application No. 63/158,528, filed on Mar. 9, 2021.

(51) Int. Cl.
*G01J 5/02* (2022.01)
*G01J 5/00* (2022.01)
(Continued)

(52) U.S. Cl.
CPC ........... *G01J 5/0275* (2013.01); *G01J 5/0025* (2013.01); *G01J 5/0265* (2013.01); *G01J 5/027* (2013.01);
(Continued)

(58) Field of Classification Search
CPC ...... G01J 5/0275; G01J 5/0025; G01J 5/0265; G01J 5/07; G01J 5/0859; G01J 5/0896
See application file for complete search history.

(56) References Cited

U.S. PATENT DOCUMENTS 7,787,663 B2    8/2010  Hartlove et al.
8,275,413 B1    9/2012  Fraden et al.
(Continued)

FOREIGN PATENT DOCUMENTS

CN    206621349 U    11/2017
CN    208598384 U    3/2019
(Continued)

OTHER PUBLICATIONS

Fraden Corp., "Fever Detector for Smartphone," Source-Fraden Corp., Cision PR Newwire, http://www.fraden.com, pp. 1-3 (2014).
(Continued)

*Primary Examiner* — Patrick Assouad
*Assistant Examiner* — Julia Fitzpatrick
(74) *Attorney, Agent, or Firm* — Merchant & Gould P.C.

(57) ABSTRACT

A thermometer includes one or more temperature sensors mounted on a housing. The one or more temperature sensors determine a temperature of at least one measurement site without contact. The non-contact thermometer displays an indicator to assist alignment of the one or more temperature sensors with the at least one measurement site, receives at least one measurement reading from the at least one measurement site, determines a temperature based on the at least one measurement reading, and displays the temperature on a display unit.

15 Claims, 24 Drawing Sheets

(51) Int. Cl.
*G01J 5/03* (2022.01)
*G01J 5/07* (2022.01)
*G01J 5/08* (2022.01)

(52) U.S. Cl.
CPC .. *G01J 5/03* (2022.01); *G01J 5/07* (2022.01); *G01J 5/0859* (2013.01); *G01J 5/0896* (2013.01)

(56) References Cited

U.S. PATENT DOCUMENTS

| | | | |
|---|---|---|---|
| 8,821,010 | B2 | 9/2014 | Bellifemine et al. |
| 9,375,149 | B2 | 6/2016 | Lane et al. |
| 9,506,809 | B2 | 11/2016 | Shin |
| 9,606,003 | B2 | 3/2017 | Gerlitz |
| 9,750,414 | B2 | 9/2017 | Lane et al. |
| 9,901,258 | B2 | 2/2018 | Mullin et al. |
| 10,113,913 | B2 | 10/2018 | Tzvieli et al. |
| 10,123,732 | B2 | 11/2018 | Abreu |
| 10,226,184 | B2 | 3/2019 | Lee et al. |
| 10,231,614 | B2 | 3/2019 | Krueger |
| 10,383,525 | B2 | 8/2019 | Abreu |
| 10,448,825 | B2 | 10/2019 | Tsai et al. |
| 10,448,890 | B2 | 10/2019 | Abreu |
| 10,502,629 | B2 | 12/2019 | Johnson |
| 10,638,936 | B2 | 5/2020 | Lane et al. |
| 10,739,202 | B2 | 8/2020 | Shim et al. |
| 10,813,559 | B2 | 10/2020 | Frank et al. |
| 10,852,525 | B2 | 12/2020 | Kamakura et al. |
| 11,867,566 | B2 | 1/2024 | Lane et al. |
| 2005/0271117 | A1 | 12/2005 | Grassi et al. |
| 2006/0020184 | A1 | 1/2006 | Woods et al. |
| 2008/0174733 | A1 | 7/2008 | Chang |
| 2008/0219318 | A1 | 9/2008 | Yue |
| 2013/0162796 | A1 | 6/2013 | Bharara et al. |
| 2014/0003463 | A1 | 1/2014 | Jackson et al. |
| 2016/0262629 | A1 | 9/2016 | Abreu |
| 2016/0262631 | A1 | 9/2016 | Shen |
| 2016/0287087 | A1 | 10/2016 | Abreu |
| 2017/0156597 | A1 | 6/2017 | Whitehead |
| 2017/0241843 | A1 | 8/2017 | Jeon et al. |
| 2017/0258335 | A1 | 9/2017 | Heller |
| 2019/0212214 | A1 | 7/2019 | Liang |
| 2020/0003623 | A1* | 1/2020 | Bellifemine .......... G01J 5/0275 |
| 2020/0069239 | A1 | 3/2020 | Tsai et al. |
| 2020/0300715 | A1 | 9/2020 | Ho et al. |

FOREIGN PATENT DOCUMENTS

| | | |
|---|---|---|
| CN | 109620170 A | 4/2019 |
| CN | 111896116 A | 11/2020 |
| CN | 211934018 U | 11/2020 |
| EP | 0984255 A1 | 3/2000 |
| GB | 2380791 B | 4/2005 |
| JP | 2012170735 A | 9/2012 |
| JP | 2014190739 A | 10/2014 |
| JP | 6128379 B2 | 5/2017 |
| KR | 20180023198 A | 3/2018 |
| RU | 2302194 C1 | 7/2007 |
| WO | 2012174453 A2 | 12/2012 |
| WO | 2019194658 A1 | 10/2019 |

OTHER PUBLICATIONS

Plamedie Ifasso, "Local Company's Temperature Kiosks Can Help Businesses Reopen Safely," Healthcare Business, Wello Dmagazine, pp. 1-5 (2020).

Hale, Mike, "Hands Up for the HandRef," https://www.opticianonline.net/features/hands-handyref, pp. 1-8 (2015).

Ricoh Imaging Americas Corporation, "Ricoh launches new-concept series of multi-function binoculars/monoculars including the world's first detachable design," https://www.prnewswire.com/news-releases, Cision PR Newwire, pp. 1-10 (2020).

Raj, Devaki, "Using AI to Improve Thermal Imaging," CrowdAI.com, https://blog.crowdai.com/ai-improve-thermal-imaging/, pp. 1-7 (2020).

Ramachandra, V. et al., "The Cyclops 33 radiation thermometer," Anaesthesia, vol. 44, pp. 328-331 (1989).

* cited by examiner

NONCONTACT THERMOMETER

BACKGROUND

Temperature is an important vital sign in patient evaluation. Physicians commonly use a variety of methods for determining patient temperature including, for example, obtaining temperature measurements with a thermometer. Modern thermometers typically employ one or more electronic sensors configured to measure patient temperature. Such sensors may take one or more measurements over a relatively short period of time. Based on these measurements, the thermometer may generate an estimated body temperature of the patient.

Some types of thermometers employ a sensing element configured to measure the temperature of, for example, the patient's forehead, temple, and/or other external body surfaces without contacting these surfaces. The accuracy of temperature measurements taken with these thermometers is highly dependent upon the distance and alignment of the thermometer relative to the external body surface. However, such thermometers are typically not configured to assist users in properly orienting the thermometer prior to taking measurements. Thus, the measurements taken with such thermometers are prone to error, and existing non-contact thermometers are not highly reliable as a means of patient evaluation.

SUMMARY

In general terms, the present disclosure relates to determining a patient's temperature without contacting the patient. Various aspects are described in this disclosure, which include, but are not limited to, the following aspects.

In one aspect, a non-contact thermometer comprises: a housing; a display unit coupled to the housing; one or more temperature sensors mounted on the housing, the one or more temperature sensors configured to determine a temperature of at least one measurement site without contact; at least one processing device operatively connected to the one or more temperature sensors and the display unit; and at least one computer readable data storage device storing software instructions that, when executed by the at least one processing device, cause the non-contact thermometer to: display an indicator to assist alignment of the one or more temperature sensors with the at least one measurement site; receive at least one measurement reading from the at least one measurement site; determine a temperature based on the at least one measurement reading; and display the temperature on the display unit.

In another aspect, a non-contact thermometer comprises: a housing having first and second portions, the first portion being configured to be grasped by a hand, and the second portion being configured to rotate relative to the first portion; one or more temperature sensors mounted on the second portion of the housing, and configured to determine a temperature of at least one measurement site without contact; at least one processing device operatively connected to the one or more temperature sensors; and at least one computer readable data storage device storing software instructions that, when executed by the at least one processing device, cause the non-contact thermometer to: rotate the second portion of the housing to scan the one or more temperature sensors across a facial profile that includes one or more measurement sites; receive measurement readings from the one or more temperature sensors; and determine a temperature based on the measurement readings.

In another aspect, a non-contact thermometer comprises: a housing having first and second portions, the first and second portions each having a distal end for facing a patient and a proximal end for facing a clinician, and being configurable for rotation between binocular and monocular configurations; at least one temperature sensor mounted on the distal end of the first portion and at least one temperature sensor mounted on the distal end of the second portion, the temperature sensors each configured to determine a temperature without contact; at least one processing device operatively connected to the temperature sensors; and at least one computer readable data storage device storing software instructions that, when executed by the at least one processing device, cause the non-contact thermometer to: detect whether the first and second portions are in the binocular configuration or the monocular configuration; receive measurement readings from the temperature sensors based on the detected configuration of the first and second portions; and determine a temperature based on the measurement readings.

In another aspect, a non-contact thermometer comprises: a housing having an exterior surface; temperature sensors mounted on the exterior surface, the temperature sensors configured to determine a temperature of one or more measurement sites without contact; at least one processing device operatively connected to the temperature sensors; and at least one computer readable data storage device storing software instructions that, when executed by the at least one processing device, cause the non-contact thermometer to: provide a target to assist in horizontal and vertical alignment of the one or more second measurement sites with the temperature sensors; receive at least one measurement reading of the one or more measurement sites; and determine a temperature based on the at least one measurement reading.

DESCRIPTION OF THE FIGURES

The following drawing figures, which form a part of this application, are illustrative of the described technology and are not meant to limit the scope of the disclosure in any manner.

DETAILED DESCRIPTION

The present disclosure generally relates to improving the alignment of a non-contact thermometer for obtaining a temperature of a patient. In some examples, the temperature is based on measurement readings from an inner-canthal region. The inner-canthal region is a region that extends from approximately the nose to at least a portion of each eye (such as a corner of each eye), and may include at least the tear duct, a portion of the sinus region, and the upper cheek. The non-contact thermometer can use the measurement readings from one or both of the inner-canthal regions and from other regions on the patient to estimate a temperature of the patient.

In one exemplary implementation, the non-contact thermometer is used for screening patients who have temperatures above a normal range (i.e., a fever), which can be symptomatic of a disease such as COVID-19. An operator of the non-contact thermometer does not need to physically contact the patient in order to estimate the patient's temperature. Advantageously, this allows the operator to maintain a safe distance from the patient to reduce exposure between the patient and clinician and help minimize the spread of infectious diseases.

While the present disclosure describes the non-contact thermometer as obtaining measurement readings from one or both of the inner-canthal regions, the non-contact thermometer may also obtain readings in additional areas including, without limitation, the forehead, temples, cheeks, as well as other areas of the patient's body. The measurement readings from one or both of the inner-canthal regions can be combined with readings of the forehead, temples, cheeks, and the like for estimating the patient's temperature.

Figure 1:
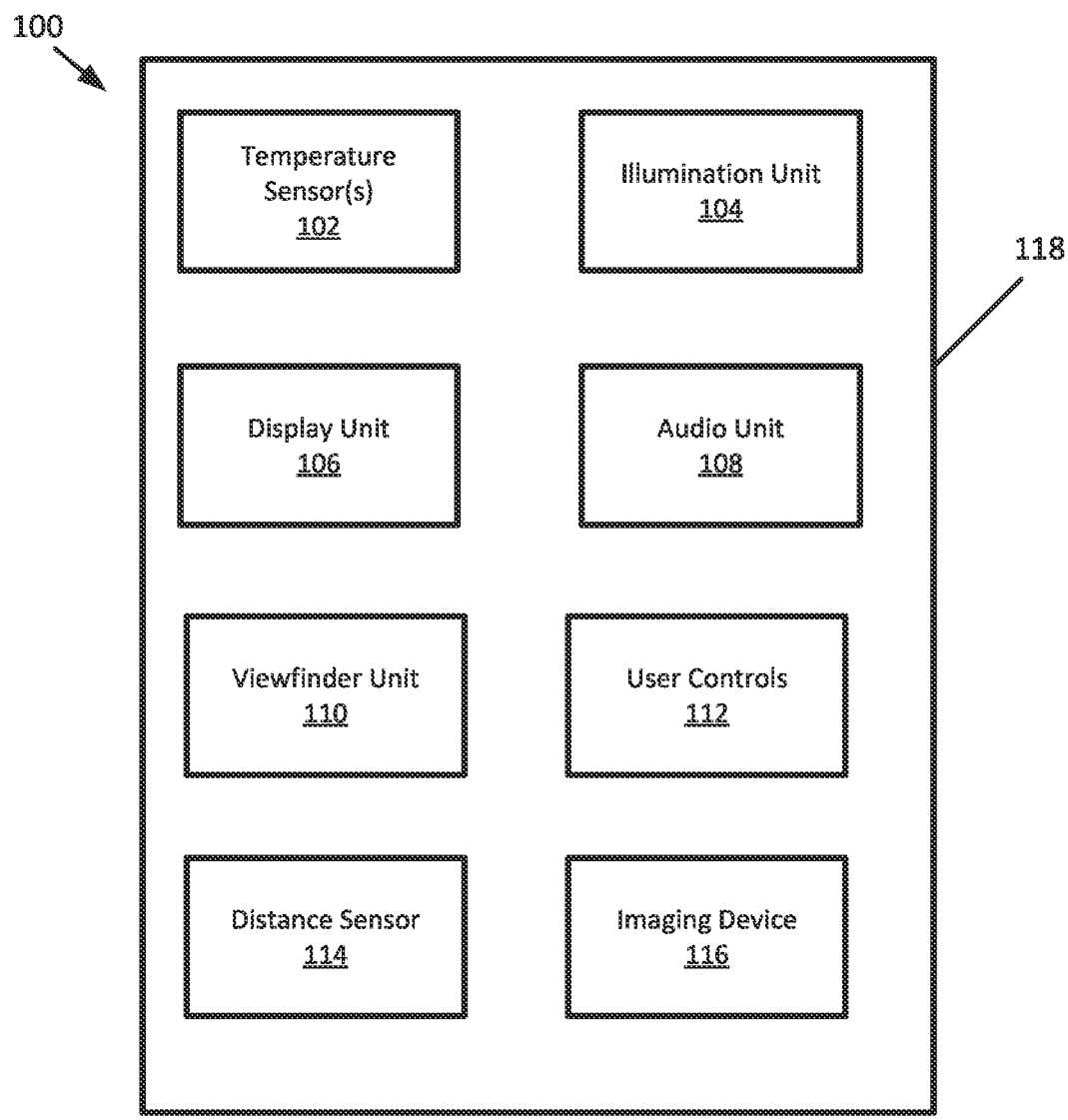
FIG. 1 schematically illustrates functional components of a non-contact thermometer.

FIG. 1 schematically illustrates exemplary functional components of a non-contact thermometer 100 in accordance with the present disclosure. The non-contact thermometer 100 may include similar components as the ones shown and described in U.S. Pat. No. 10,638,936, issued on May 5, 2020, and in U.S. Pat. No. 9,901,258, issued on Feb. 27, 2018, the entireties of which are hereby incorporated by reference.

Referring now to FIG. 1, the non-contact thermometer 100 includes one or more temperature sensors 102, an illumination unit 104, a display unit 106, an audio unit 108, a viewfinder unit 110, one or more user controls 112, a distance sensor 114, and an imaging device 116. Each of these components are housed within a housing 118 of the non-contact thermometer 100, or are mounted on the housing 118, or are at least partially housed inside the housing 118 and mounted thereon. Alternative configurations are possible in which the non-contact thermometer 100 may include additional components not shown in the figures or may not include all components shown in the figures such that some components are optional.

The temperature sensors 102 are non-contact temperature sensors such that they are configured to determine a temperature of a measurement site without contacting the patient. As described above, in certain examples the measurement site is an inner-canthal region.

In some examples, the non-contact thermometer 100 is an infrared thermometer. For example, the one or more temperature sensors 102 may include an infrared temperature sensor such as a thermopile or similar infrared-based temperature sensing devices. The thermopile converts thermal energy into electrical energy and generates an output voltage proportional to a local temperature difference and/or temperature gradient. The thermopile may comprise two or more thermocouples connected in series or in parallel.

In examples where the non-contact thermometer 100 is an infrared thermometer, the one or more temperature sensors 102 receive and emit radiation, such as thermal and/or infrared radiation. For example, the temperature sensors 102 are configured to sense, detect, collect, or otherwise receive infrared radiation emitted from a measurement site such as an inner-canthal region next to an eye. In such embodiments, the temperature sensors 102 are configured to collect the infrared radiation, and to send a signal indicative of the collected infrared radiation.

In certain examples, the temperature sensors 102 include a first sensor configured to collect radiation from a first measurement site such as the inner-canthal region next to the left eye, and a second sensor configured to collect radiation from a second measurement site such as the inner-canthal region next to the right eye. In such examples, the first sensor determines a temperature of the first measurement site while the second sensor determines a temperature of the second measurement site. The non-contact thermometer 100 uses the information received from the first and second sensors to estimate a temperature of the patient.

The illumination unit 104 generates a beam of light that is visible for a clinician to visualize the alignment of the temperature sensors 102 with a portion of the patient's body such as the patient's face, and in particular, the inner-canthal regions of the patient's face. Also, the light beam can help a clinician visualize that the non-contact thermometer 100 is within a proper distance of the patient for obtaining accurate measurement readings. For example, the light beam becomes more focused as the non-contact thermometer 100 is brought into closer proximity to the patient. Thus, the light beam generated from the illumination unit 104 can represent the field of view of the temperature sensors 102 such that as the non-contact thermometer 100 is moved toward or away from a measurement site, such as the inner-canthal regions of the patient's face, the projection and focus of the light beam on the patient's face changes.

In certain examples, the illumination unit 104 includes one or more light-emitting diodes (LEDs). Alternatively, the illumination unit 104 can include alternative devices for generating the beam of light such as lamps, light bulbs, and similar devices.

The illumination unit 104 generates the beam of light at a wavelength such that it does not interfere with the thermal and/or infrared radiation received by the one or more temperature sensors 102. For example, the illumination unit 104 can generate various beams of light between the blue, green, yellow, and amber spectrums (i.e., between 450-615 nm).

The display unit 106 is mounted on the housing 118 of the non-contact thermometer 100, and is configured to display the estimated temperature of the patient based on at least the measurement readings obtained from the one or more temperature sensors 102. In some examples, the display unit 106 can display an error reading when the non-contact thermometer 100 is unable to accurately estimate the temperature of the patient such as when the temperature sensors 102 are not properly aligned with the measurement site.

In some examples, the display unit 106 can display a message that identifies a reason for the error reading, and provides instructions for a clinician to properly align the temperature sensors 102 such as to move the non-contact thermometer 100 into closer proximity of the patient, or to point the non-contact thermometer 100 in a different direction.

In examples where the non-contact thermometer is used for screening patients, the display unit 106 displays one or more types of messages or icons that can indicate that the temperature of the patient is within a normal range (i.e., the patient does not have a fever), or that can indicate that the temperature of the patient is above the normal range (i.e., the patient has a fever). Additional information may be displayed on the display unit 106 as well.

The audio unit 108 is mounted on the housing 118 of the non-contact thermometer 100, and can generate an audio output to indicate that the temperature sensors 102 are properly aligned with the desired measurement sites, that the non-contact thermometer 100 is within a proper distance of the patient, or that a temperature of the patient has been acquired. For example, the audio unit 108 can emit a sound when a temperature estimate is obtained from measurement readings of the one or more temperature sensors 102.

The viewfinder unit 110 provides an additional mechanism that can help a clinician to properly align the temperature sensors 102 with desired measurement sites such as the inner-canthal regions. In some examples, the viewfinder unit 110 helps a patient use and properly align the non-contact thermometer 100 without assistance from a clinician.

Figure 19:
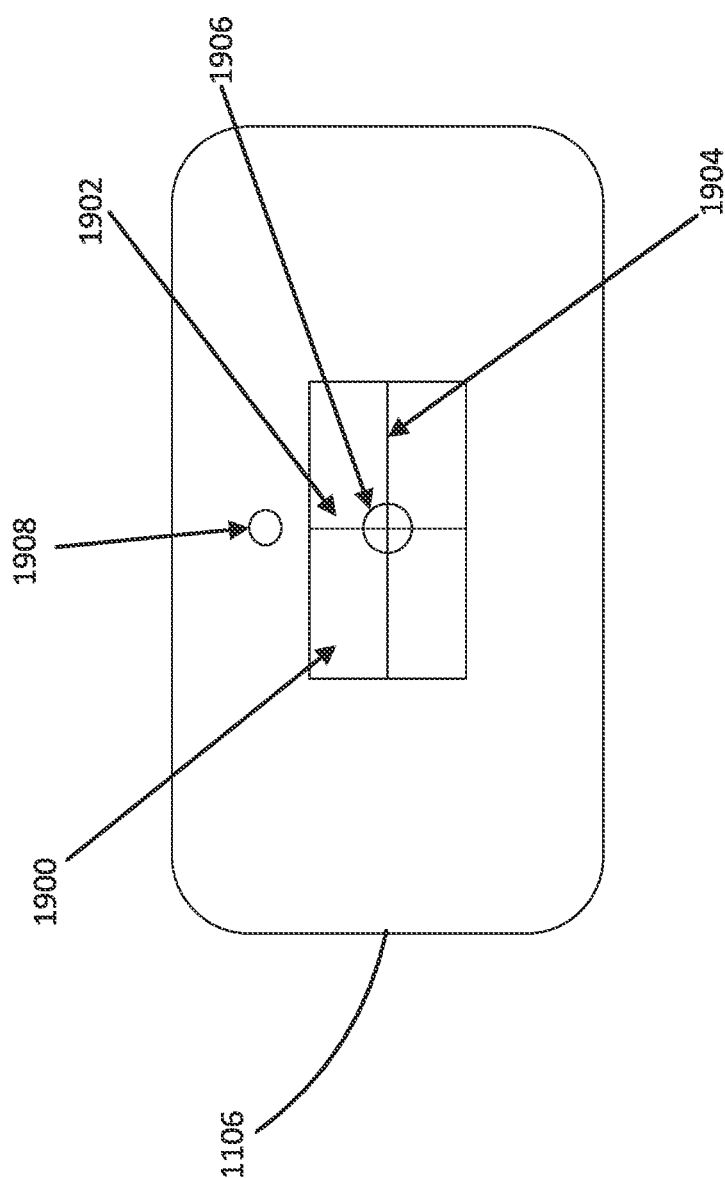
FIG. 19 illustrates a viewfinder screen from the perspective of a clinician taking a temperature measurement.
Figure 23:
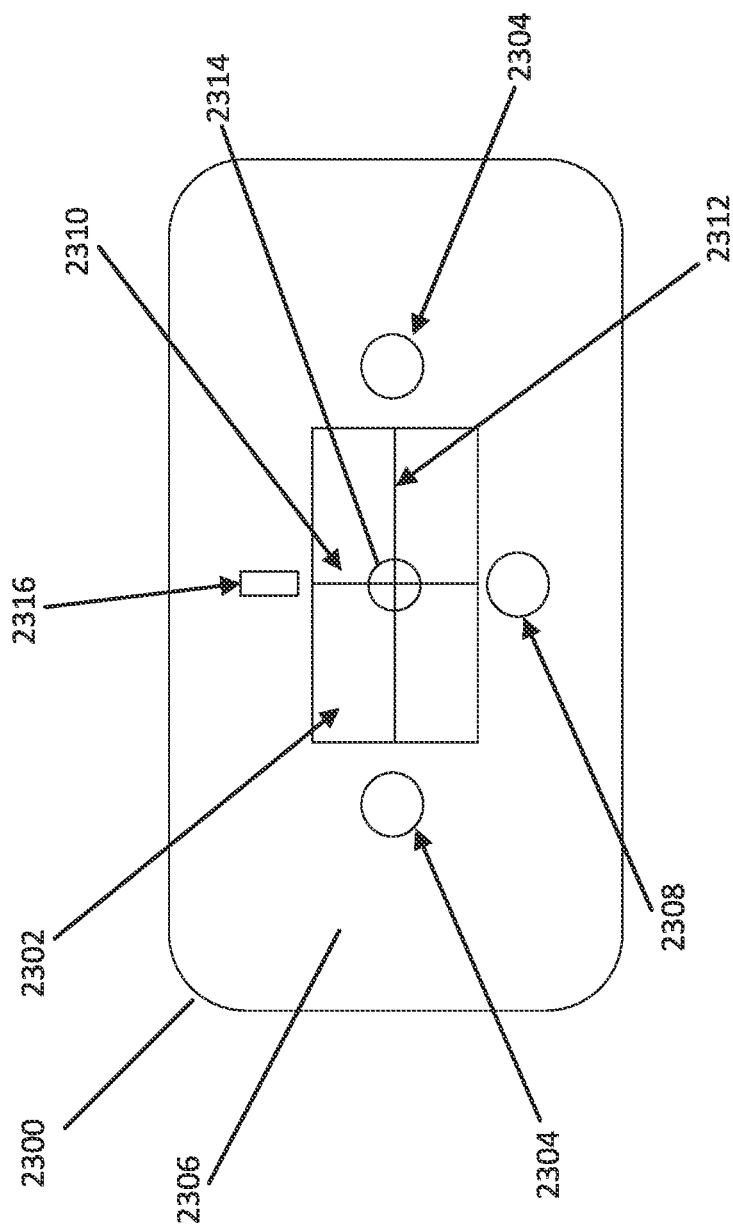
FIG. 23 illustrates a viewfinder screen from the perspective of a patient or user receiving a temperature measurement.

The viewfinder unit 110 can generate an indicator to assist horizontal alignment of the one or more temperature sensors with the first and second measurement sites. For example, the viewfinder unit 110 can generate an overlay of an image captured by the imaging device 116, and displayed on the display unit 106 that can be used by a clinician or user to properly align the one or more temperature sensors 102 with desired measurement sites. The viewfinder unit 110 can generate viewfinder screens, illustrative examples of which are shown in FIGS. 19 and 23.

The user controls 112 are selectable by a user of the non-contact thermometer 100 to turn on and off the non-contact thermometer 100, to capture a temperature estimate, and to perform additional functions such as capturing an image using the imaging device 116, generating a beam of light using the illumination unit 104, displaying information on the display unit 106, and the like. In some instances, the user is a clinician who uses the non-contact thermometer 100 to obtain a temperature estimate of a patient.

In other instances, the user is a patient who uses the non-contact thermometer 100 to obtain a temperature estimate without assistance from a clinician. The temperature estimate can be automatically captured without requiring input from the user once the temperature sensors 102 are within a proper distance and are aligned with the one or more measurement sites.

The distance sensor 114 determines whether the one or more temperature sensors 102 are within a predetermined and/or desired distance range of a desired measurement site such as the inner-canthal region. The distance sensor 114 may include, for example, an inductive sensor, a magnetic sensor, an infrared sensor, a capacitive photoelectric sensor, a sonic distance sensor, or similar proximity sensors. In some examples, the distance sensor 114 emits a signal that impinges upon an object, and at least a portion of the signal returns to the distance sensor 114 for measuring a distance between the distance sensor 114 and the object.

The imaging device 116 generates one or more images of the patient. The imaging device 116 can include one or more digital cameras, infrared sensors, or similar devices that are configured to assist in generating an image of the patient. For example, the imaging device 116 can include a digital camera configured to capture an image of a desired measurement site where a measurement reading is obtained using the temperature sensors 102. Alternatively or in addition, the imaging device 116 may be configured to collect thermal, infrared, and/or other radiation emitted by the patient, and to assist in forming a thermal image of the patient's face.

Figure 2:
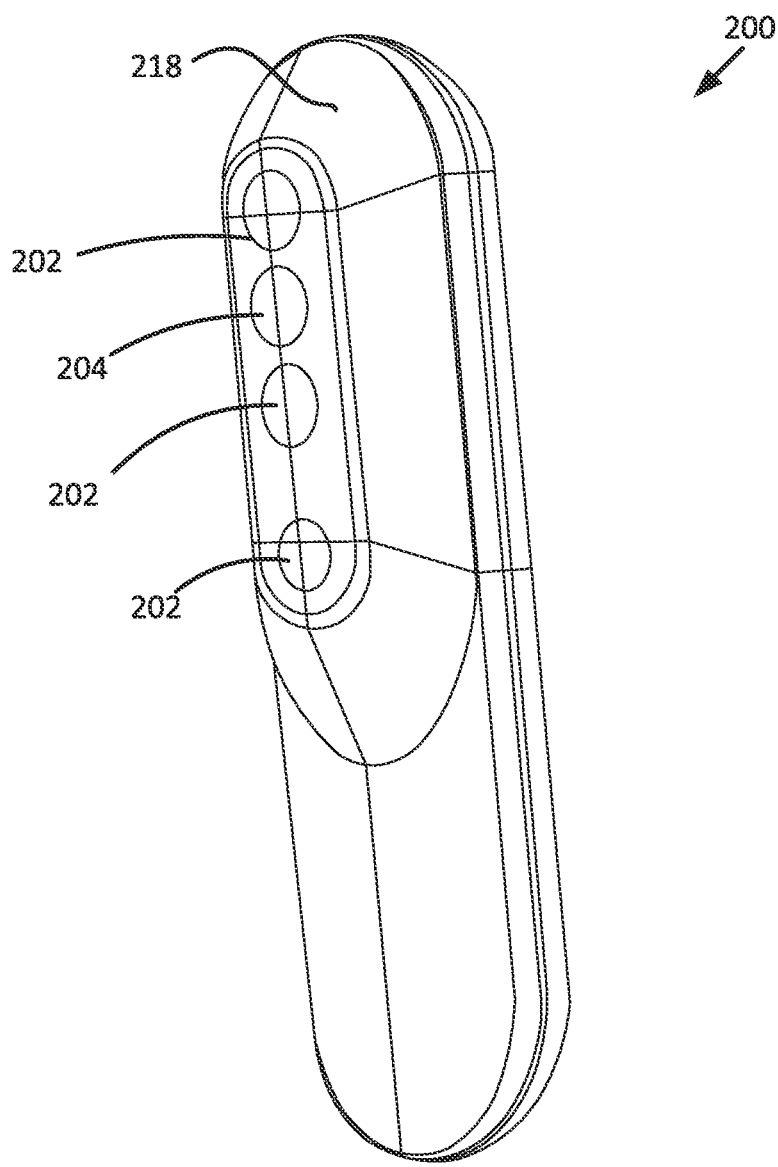
FIG. 2 is an isometric view of an example non-contact thermometer shown from the perspective of a patient receiving a temperature measurement.
Figure 3:
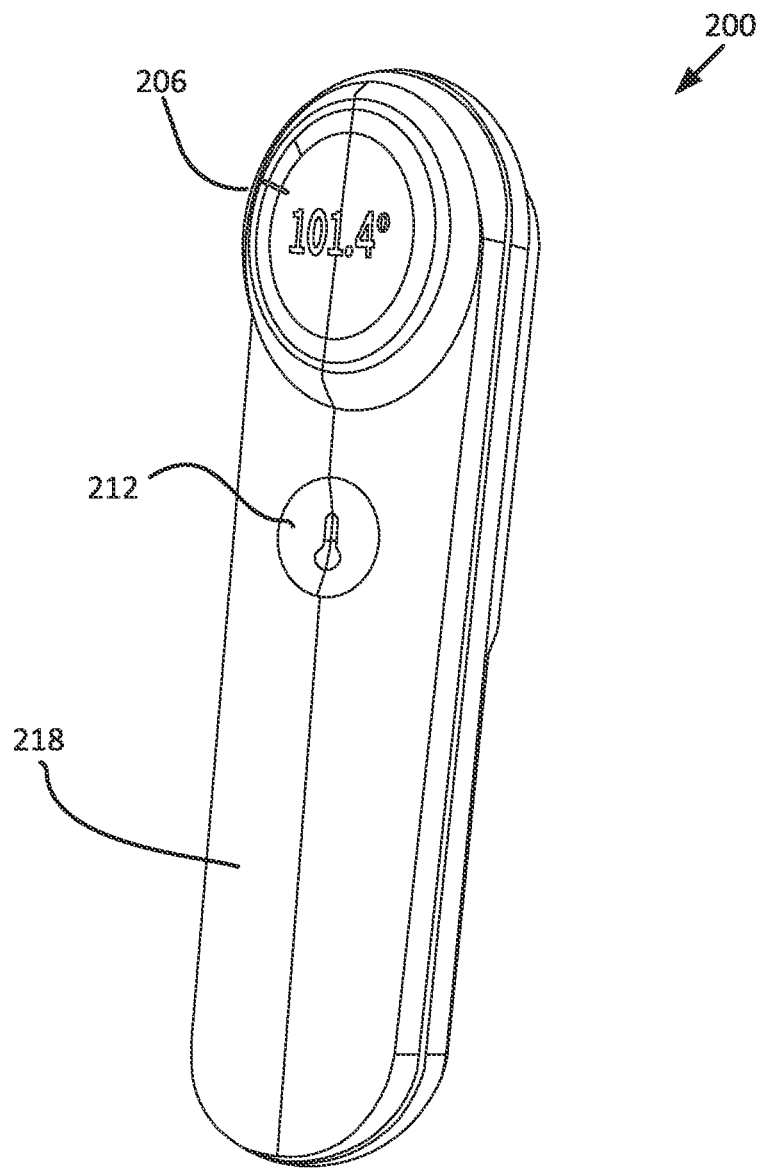
FIG. 3 is another isometric view of the example non-contact thermometer of FIG. 2 shown from the perspective of a clinician taking a temperature measurement.
Figure 4:
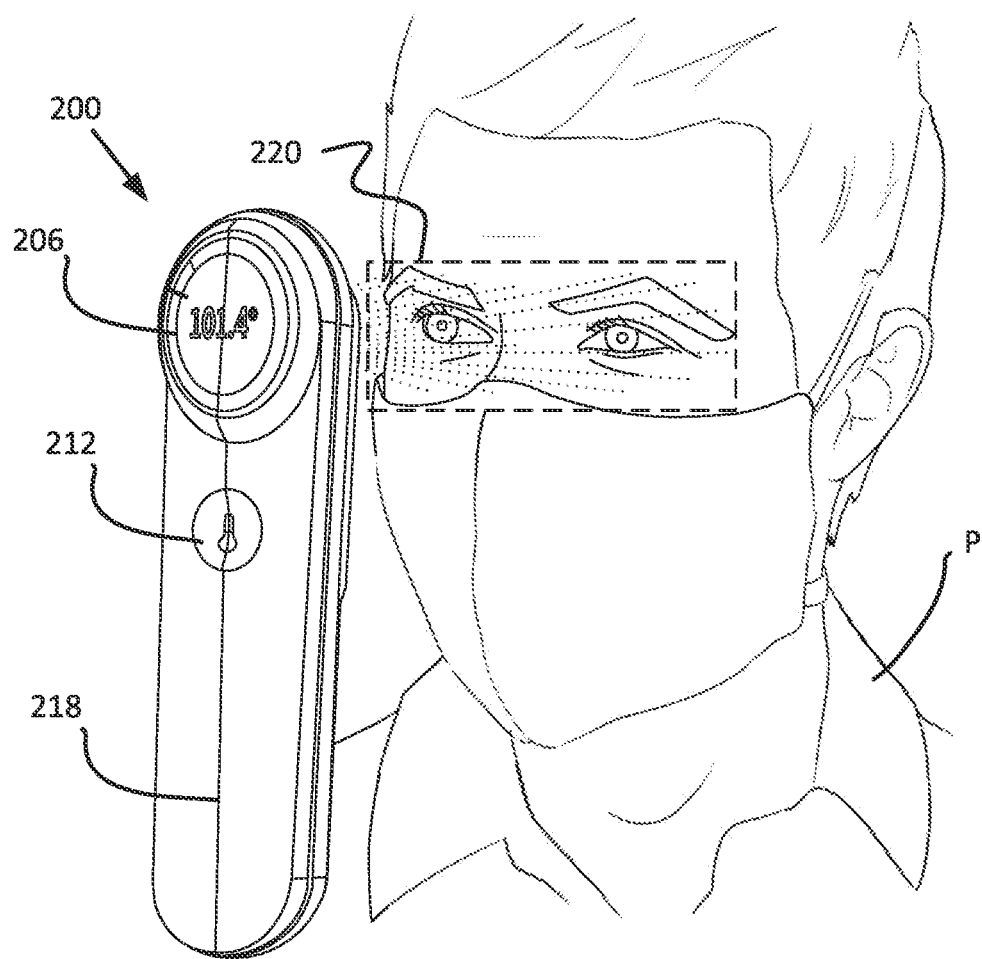
FIG. 4 is another isometric view of the example non-contact thermometer of FIG. 2 while in use for measuring a temperature of a patient.

FIGS. 2-4 are isometric views of a non-contact thermometer 200 in accordance with an example embodiment of the present disclosure. In the example shown in FIGS. 2-4, the non-contact thermometer 200 has a wand-like configuration such that it is configured for handheld use. For example, the non-contact thermometer 200 has a housing 218 that is shaped to be grasped by a user's hand. The non-contact thermometer 200 can include any of the exemplary functional components shown in FIG. 1 and that are described above.

The non-contact thermometer 200 includes on one side of the housing 218 one or more temperature sensors 202 and an illumination unit 204. In the example shown in FIG. 2, the non-contact thermometer 200 includes three temperature sensors 202. In at least some examples, two temperature sensors are dedicated for obtaining measurement readings of the inner-canthal regions next to the left and right eyes of the patient, while a third temperature sensor is dedicated for obtaining measurement readings of another area on the patient's face such as the patient's forehead. The measurement readings obtained from the temperature sensors 202 are used by the non-contact thermometer 200 to estimate a temperature of the patient.

As shown in FIG. 3, the non-contact thermometer 200 includes on an opposite side of the housing 218 a display unit 206 and a user control 212. The display unit 206 displays the estimated temperature of the patient based on at least the measurement readings obtained from the temperature sensors 202. A user can wrap their fingers around the housing 218 to grasp the non-contact thermometer 200 and use their thumb to select the user control 212. As described above, the user control 212 is selectable by the user of the non-contact thermometer 200 to perform one or more functions such as to turn on and off the non-contact thermometer, to capture a temperature estimate, and to perform additional functions.

As shown in FIG. 4, the illumination unit 204 generates a beam of light 220 that projects onto the face of a patient P. The beam of light 220 is an example of an indicator that can help assist horizontal alignment of the one or more temperature sensors 202 with the first and second measurement sites on the patient P's face.

The beam of light 220 extends across the patient P's face such that it illuminates the area surrounding the patient P's eyes, and in particular, the inner-canthal regions of the patient P's face. The beam of light 220 can project as a line of latitude across the patient P's face.

In some examples, the line of latitude decreases in thickness as the non-contact thermometer 100 is moved in closer proximity to the patient P's face and increases in thickness as the non-contact thermometer 100 is moved away from the patient P's face. The thickness of the beam of light 220 can represent the field of view of the temperature sensors 202 such that a thicker beam of light 220 represents a wider field of view that may produce less accurate measurement readings, while a thinner beam of light 220 represents a smaller field of view that includes less noise, and hence produces more accurate measurement readings.

In the example shown in FIG. 4, the housing 218 is positioned vertically with respect to the patient P's face, and the beam of light 220 is a horizontal line of light. In this example, the temperature sensors 202 are positioned vertically with respect to the patient P's face. In alternative examples, the housing 218 of the non-contact thermometer 200 can be positioned horizontally with respect to the patient P's face such that the temperature sensors 202 are positioned horizontally relative to the patient P's face.

Advantageously, the beam of light 220 can help a clinician visualize the alignment of the temperature sensors 202 with one or more desired measurement sites such as the inner-canthal regions next to the left and right eyes of the patient P. Also, the beam of light 220 can help a clinician visualize that the non-contact thermometer 100 is within an optimal distance range of the patient P for obtaining accurate measurement readings. In certain examples, the display unit 206 can display a message that indicates that the temperature sensors 202 are within an optimal distance and are aligned with the one or more desired measurement sites. In addition, or as an alternative, the non-contact thermometer 200 can include an audio unit (such as the one shown in FIG. 1) that generates an audio output to indicate that the temperature sensors 202 are within an optimal distance and are aligned with the desired measurement sites.

The beam of light 220 generated by the illumination unit 204 can improve the workflow performed by a clinician using the non-contact thermometer 200 because the beam of light 220 can help visually guide the movement of the non-contact thermometer 200 toward the patient P's face so that the temperature sensors 202 are positioned within an optimal distance range of the patient P's face where one or more desired measurement sites are located. Additionally, the beam of light 220 can help visually guide the positioning of the non-contact thermometer 200 with respect to the patient P's face so that the temperature sensors 202 are aligned with one or more desired measurement sites. Additionally, the illumination unit 204 can lead to more accurate temperature estimates determined by the non-contact thermometer 200 by improving the alignment and positioning of the non-contact thermometer 200 relative to the one or more desired measurement sites on the patient P's face.

In certain examples, the one or more desired measurement sites on the patient P's face include a first measurement site such as the inner-canthal region next to the left eye, and a second measurement site such as the inner-canthal region next to the right eye. In some examples, the one or more desired measurement sites can include additional areas on the patient P's face such as the patient P's forehead, and other areas of the patient P's face.

Figure 5:
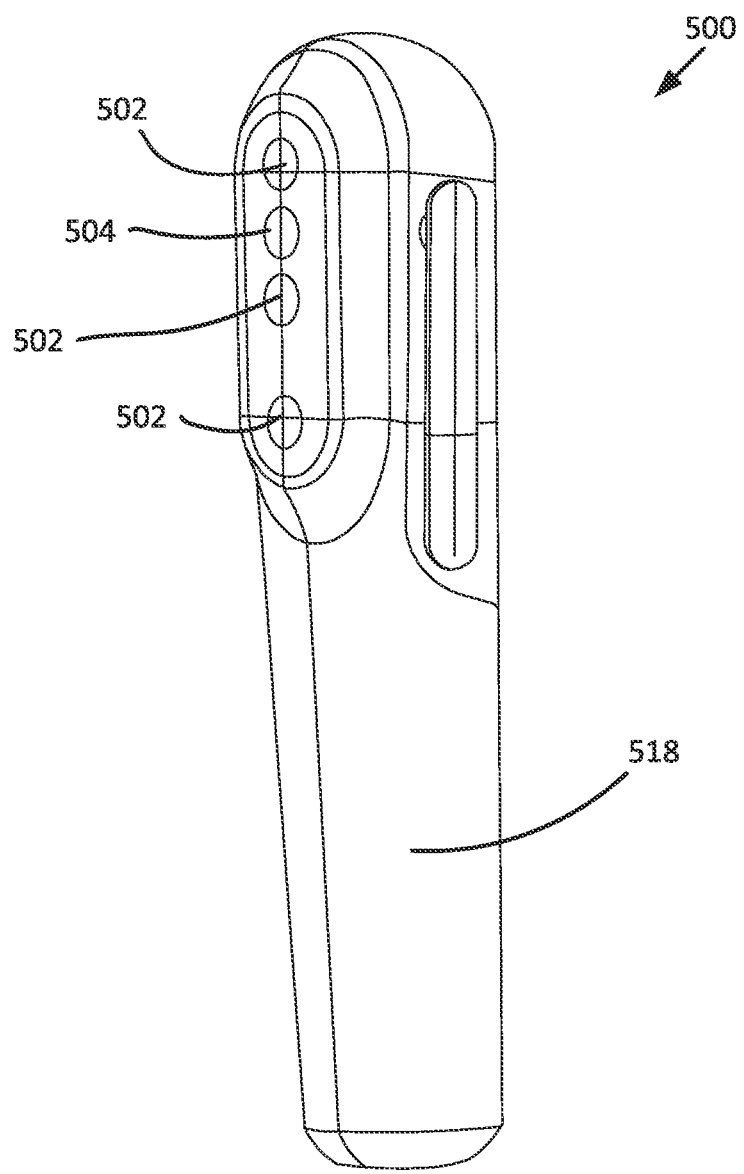
FIG. 5 is an isometric view of another example non-contact thermometer shown from the perspective of a patient receiving a temperature measurement.

FIG. 5 is an isometric view of a non-contact thermometer 500 in accordance with another example embodiment of the present disclosure. The non-contact thermometer 500 is similar to the non-contact thermometer 200 described above with respect to FIGS. 2-4, and can likewise include any one or more of the exemplary functional components shown in FIG. 1 and described above. The non-contact thermometer 500 includes a housing 518 shaped like a wand for grasping by a user's hand. The non-contact thermometer 500 further includes temperature sensors 502 similar to the temperature sensors 102, 202 that are described above, and an illumination unit 504 that is similar to the illumination units 104, 204 that are described above.

Figure 6:
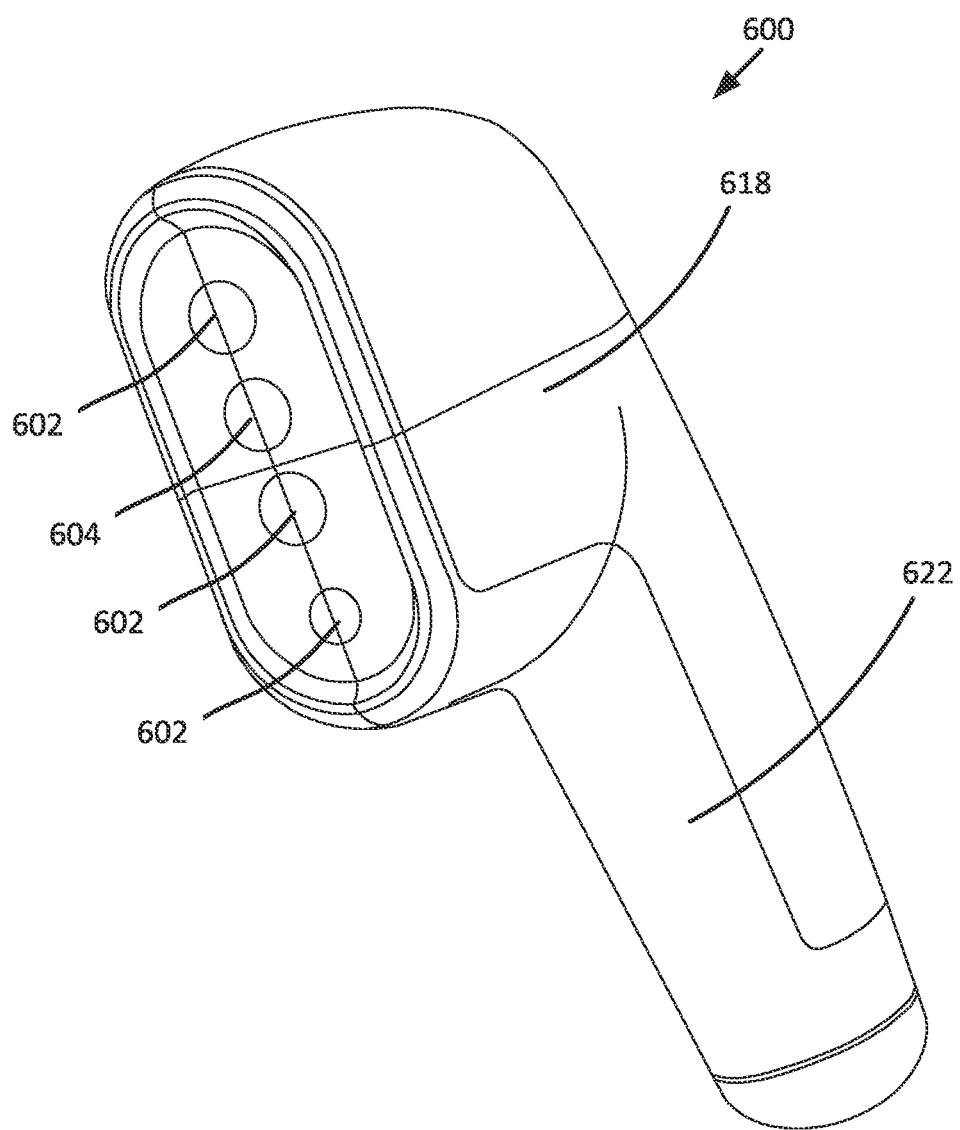
FIG. 6 is an isometric view of another example non-contact thermometer shown from the perspective of a patient receiving a temperature measurement.

FIG. 6 is an isometric view of a non-contact thermometer 600 in accordance with another example embodiment of the present disclosure. The non-contact thermometer 600 is similar to the non-contact thermometer 200 described above with respect to FIGS. 2-4 and can likewise include any one or more of the exemplary functional components shown in FIG. 1, and described above. The non-contact thermometer 600 includes a housing 618 that includes a handle portion 622 that can be grasped by a user's hand. The non-contact thermometer 600 further includes temperature sensors 602 similar to the temperature sensors 102, 202 described above, and an illumination unit 604 that is similar to the illumination units 104, 204 described above.

Figure 7:
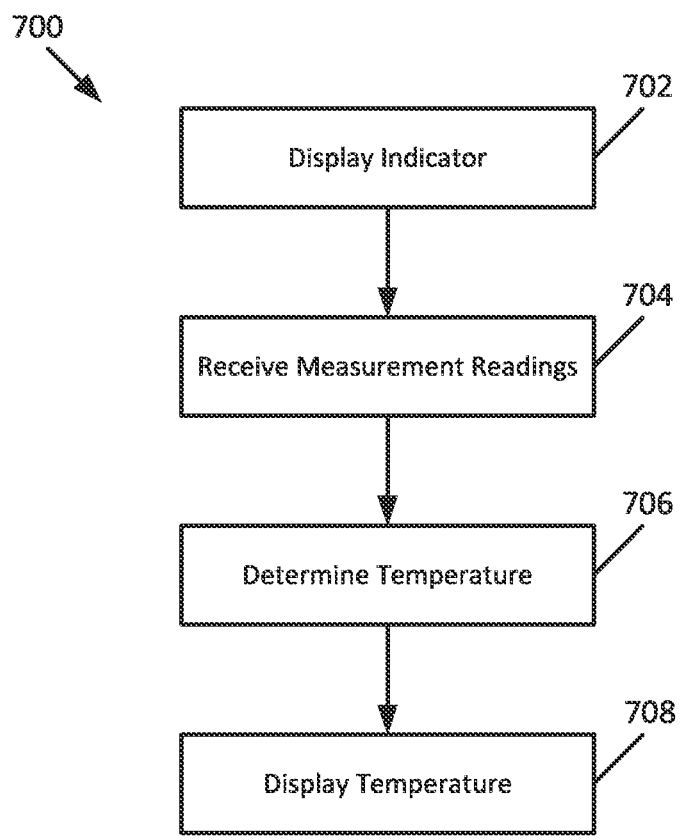
FIG. 7 illustrates a method of determining a temperature estimate using the example embodiments of the non-contact thermometer shown in FIGS. 2-6.

FIG. 7 illustrates a method 700 of determining a temperature estimate using the example embodiments of the non-contact thermometer shown in FIGS. 2-6. The method 700 includes an operation 702 of displaying an indicator to assist alignment of temperature sensors with the first and second measurement sites. In some examples, the indicator is the beam of light 220 that projects onto the face of the patient P shown in FIG. 4. In some examples, the beam of light 220 is used to horizontally align the temperature sensors 202, 502, 602 with first and second measurement sites on the patient P's face. In certain examples, the first and second measurement sites are the left and right inner-canthal regions.

Next, the method 700 includes an operation 704 of receiving at least one measurement reading of the first and second measurement sites. The at least one measurement reading is received by non-contact temperature sensors such as the temperature sensors 202, 502, 602 described above. The non-contact temperature sensors can include infrared temperature sensors such as a thermopile or similar infrared-based temperature sensing device.

Next, the method 700 includes an operation 706 of determining a temperature based on the at least one measurement reading. In some examples, the determined temperature is a core body temperature. For example, an algorithm can be stored in a memory of the non-contact thermometer to correlate the at least one measurement reading to a core body temperature. The algorithm can select a highest measurement reading acquired by the temperature sensors as an input to determine the core body temperature. Alternatively, the algorithm averages the measurement readings acquired by the temperature sensors, and selects an average measurement reading as an input to determine the core body temperature. In some examples, the algorithm applies one or more weighting factors to the at least one measurement reading to determine the core body temperature. In some examples, the algorithm uses a lookup table to correlate the at least one measurement reading to the determined core body temperature.

Next, the method 700 includes an operation 708 of displaying the determined temperature on a display unit of the non-contact thermometer. For example, the determined temperature can be displayed on the display unit 206 shown in FIG. 4.

Figure 8:
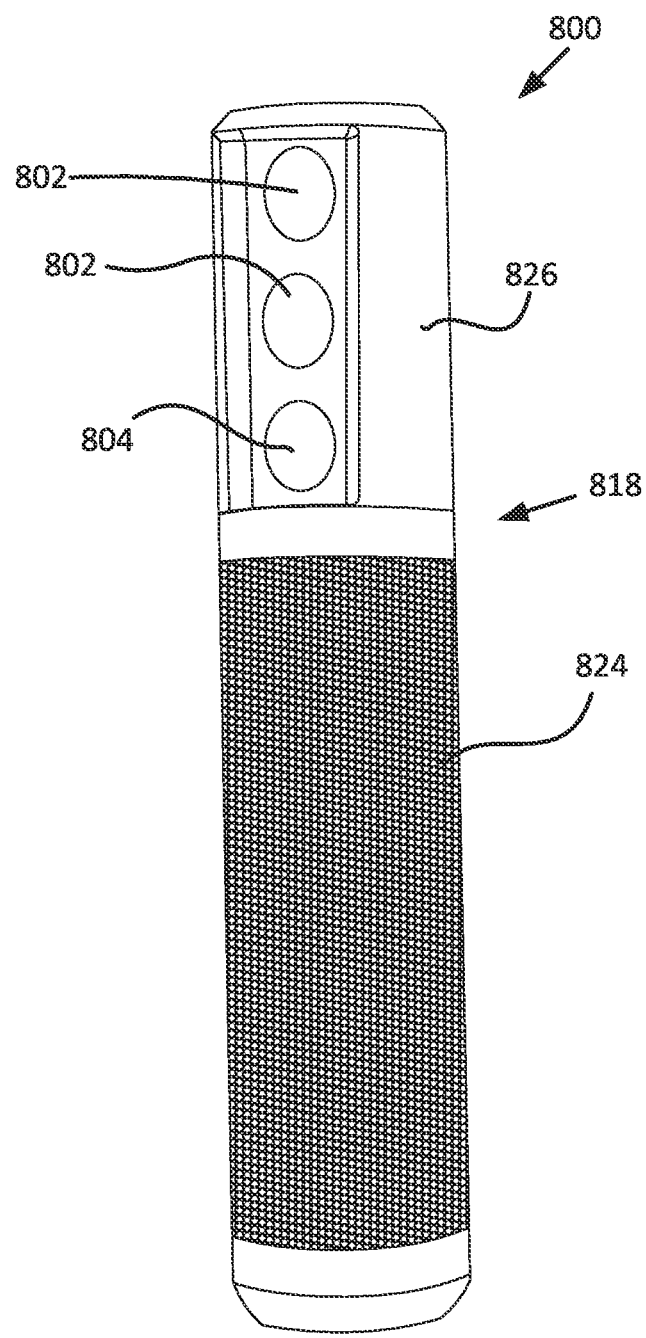
FIG. 8 is an isometric view of another example non-contact thermometer shown from the perspective of a patient receiving a temperature measurement.
Figure 9:
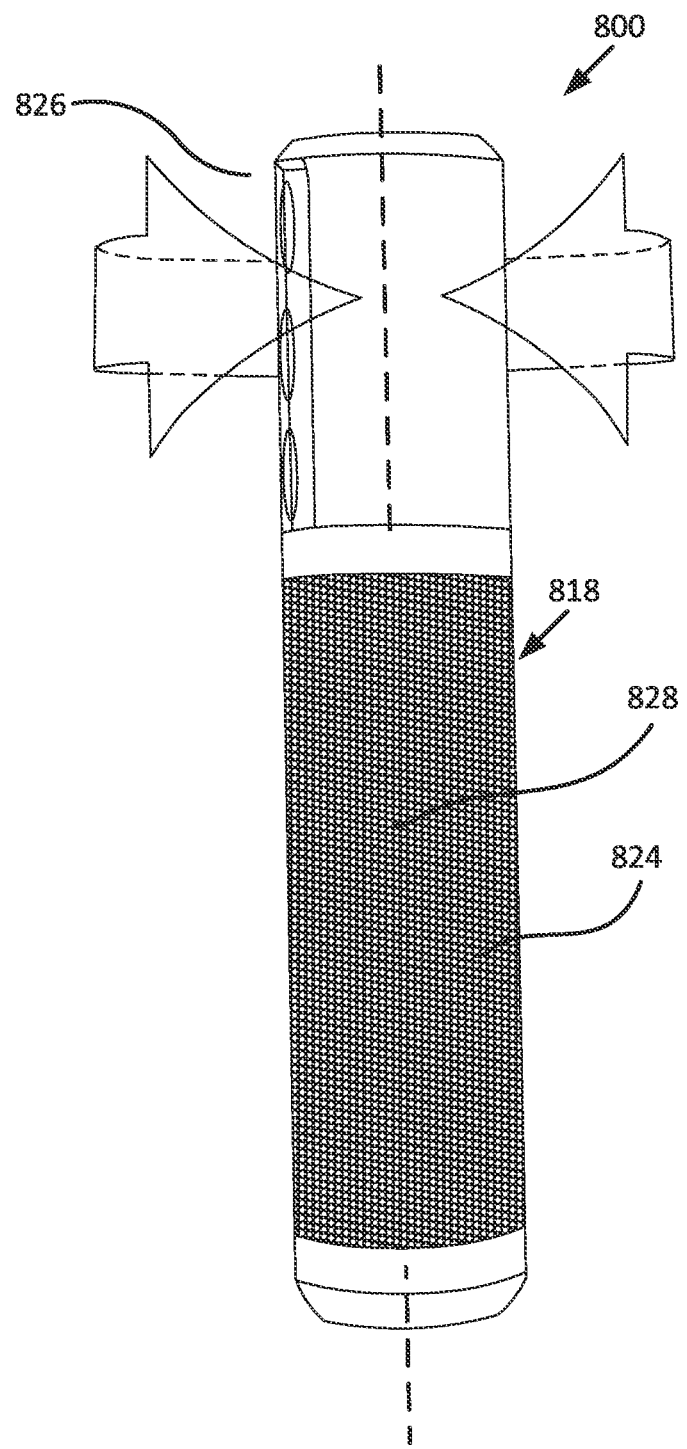
FIG. 9 is another isometric view of the example non-contact thermometer of FIG. 8 shown from the perspective of a clinician taking a temperature measurement.

FIGS. 8 and 9 are an isometric view of a non-contact thermometer 800 in accordance with another example embodiment of the present disclosure. The non-contact thermometer 800 is similar to the non-contact thermometer 200 described above with respect to FIGS. 2-4 and can likewise also include any one or more of the exemplary functional components shown in FIG. 1.

The non-contact thermometer 800 has a housing 818 that includes a first portion 824 and a second portion 826. The first portion 824 is shaped like a handle that can be grasped by a user's hand such that the non-contact thermometer 800 has a wand-like configuration such that it is configured for handheld use similar to the configurations of the non-contact thermometers 200, 500, and 600 described above in view of FIGS. 2-6. In some examples, the first portion 824 can be covered or coated with a non-slip material such as rubber, or have an etched pattern, to improve the grip of the non-contact thermometer 200.

The second portion 826 is configured to rotate relative to the first portion 824. For example, one or more electronic motors housed inside the housing 818 allow the second portion to rotate about an axis 828 (see FIG. 9) that runs along the length of the housing 818. The second portion 826 houses one or more temperature sensors 802 which are similar to the temperature sensors 102, 202 described above, and an illumination unit 804 which is similar to the illumination units 104, 204 described above.

As the second portion 826 rotates about the axis 828, the temperature sensors 802 obtain measurement readings from multiple locations on the patient's face. For example, the temperature sensors 802 can obtain measurement readings from the inner-canthal region next to the left eye, and the inner-canthal region next to the right eye, the forehead, and other areas of the patient's face. Additionally, the illumination unit 804 can project a beam of light on the patient's face to visually show the progress of the scan on the patient's face.

In some examples, it is possible for the second portion 826 to make a complete 360 degree rotation about the axis 828. In some examples, the second portion 826 rotates about the axis 828 to provide a 180 degree field of view for obtaining the measurement readings from multiple locations on the patient's face. In some examples, the second portion 826 rotates about the axis 828 in a field of view less than 180 degrees such as in a 90 degree field of view or a 45 degree field of view to obtain the measurement readings. Additional fields of view of in which the second portion 826 can rotate about the axis 828 are possible.

Figure 10:
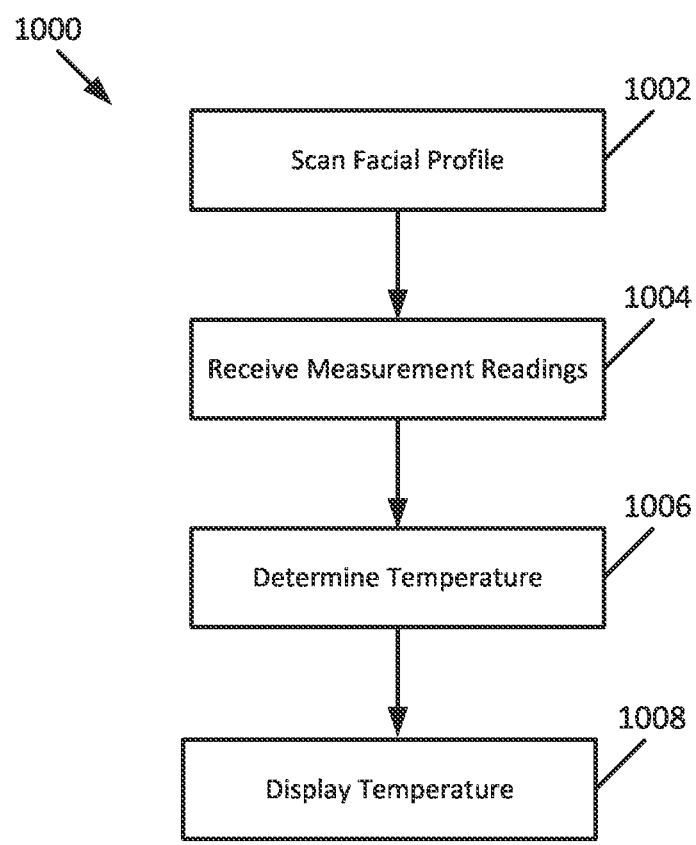
FIG. 10 illustrates a method of determining a temperature estimate using the example embodiments of the non-contact thermometer shown in FIGS. 8 and 9.

FIG. 10 illustrates a method 1000 of determining a temperature estimate using the non-contact thermometer 800. The method 1000 includes an operation 1002 of scanning a facial profile with one or more non-contact temperature sensors. For example, as shown in FIG. 9, the second portion 826 of the housing 818 can be rotated relative to the first portion 824 of the housing 818 using one or more electronic motors, while the first portion 824 is gripped by a user's hand. The second portion 826 includes temperature sensors 802 such that as the second portion 826 rotates relative to the first portion 824, the temperature sensors 802 scan across a facial profile that includes one or more measurement sites. In certain examples, the first and second measurement sites are the left and right inner-canthal regions.

Next, the method 1000 includes an operation 1004 of receiving at least one measurement reading of the first and second measurement sites. The at least one measurement reading is received by non-contact temperature sensors such as the temperature sensors 802 described above. The non-contact temperature sensors can include infrared temperature sensors such as a thermopile or similar infrared-based temperature sensing device.

Next, the method 1000 includes an operation 1006 of determining a temperature based on the at least one measurement reading. Operation 1006 can be similar to operation 706 described above with respect to the method 700 of FIG. 7.

In some examples, the method 1000 includes a further operation 1008 of displaying the determined temperature on a display unit of the non-contact thermometer or elsewhere.

FIGS. 11-14 show a non-contact thermometer 1100 in accordance with another example embodiment of the present disclosure. The non-contact thermometer 1100 includes a housing 1118 having a handle portion 1124 and a sensor portion 1126 that extends from the handle portion 1124. The non-contact thermometer 1100 is configured for handheld use. Alternatively, the non-contact thermometer 1100 can be mounted to fixture.

Figure 12:
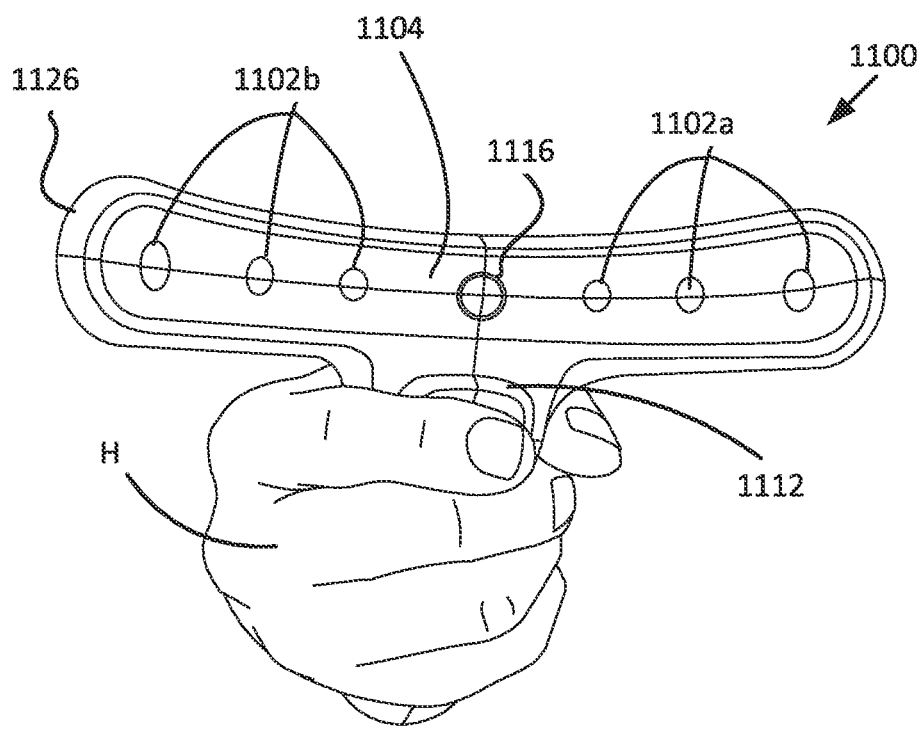
FIG. 12 shows the non-contact thermometer of FIG. 11 gripped by the hand of a user.

In the example shown in FIG. 12, the handle portion 1124 is gripped by the hand H of a user. In this example, the user can wrap their fingers around the handle portion 1124 and use their index finger to select a user control 1112 to capture a temperature estimate.

Figure 11:
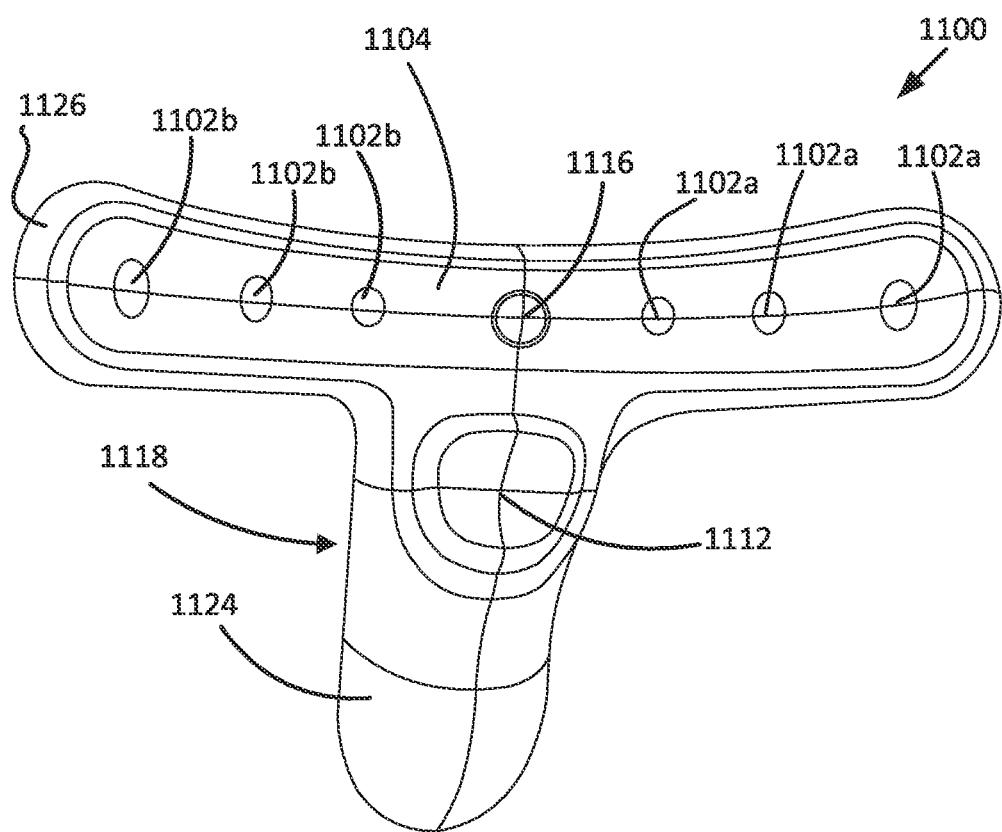
FIG. 11 is an isometric view of another example non-contact thermometer shown from the perspective of a patient receiving a temperature measurement.
Figure 13:
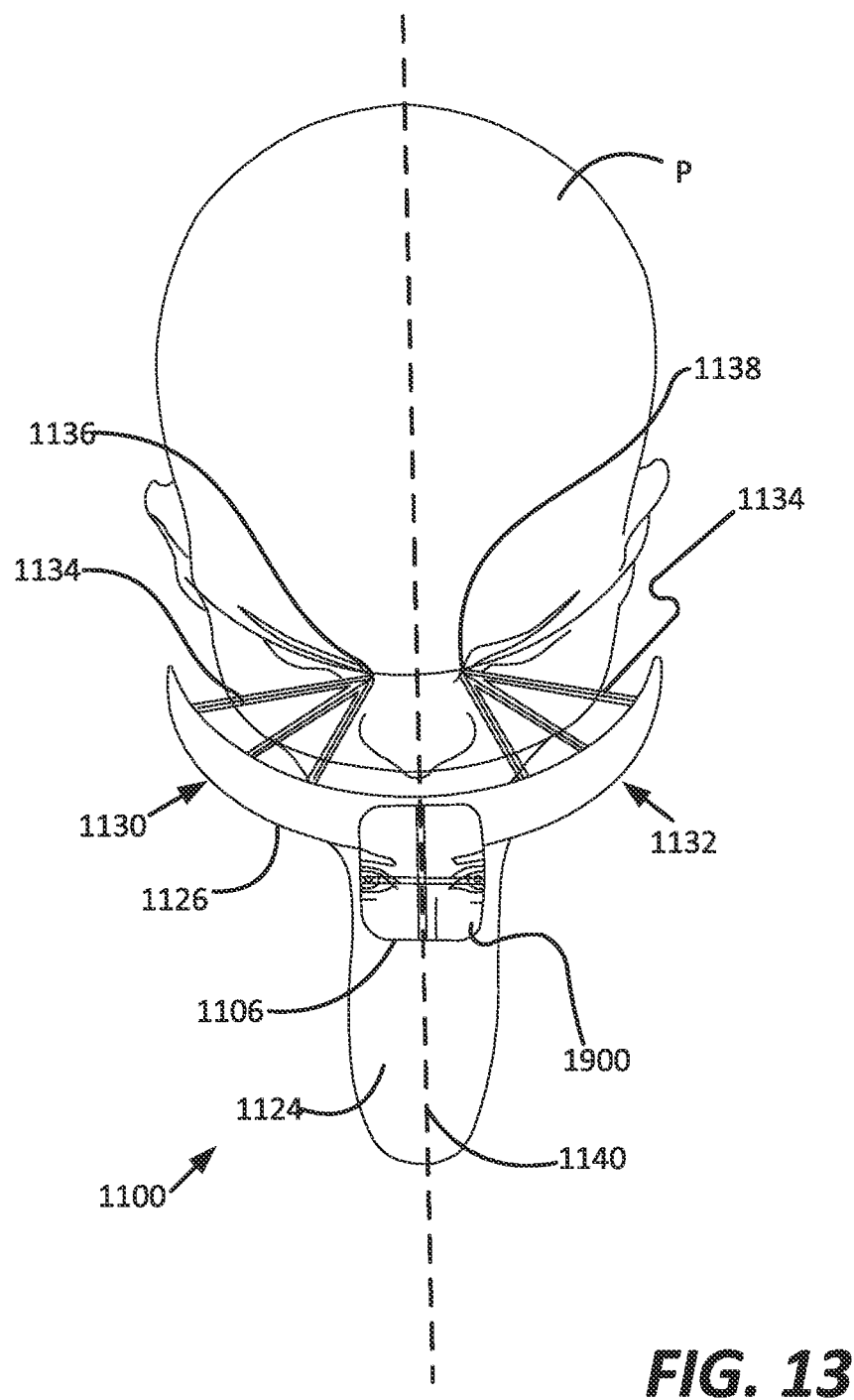
FIG. 13 is a top view of the example non-contact thermometer of FIG. 11 while in use for measuring a temperature of a patient.

FIG. 13 shows the non-contact thermometer 1100 positioned next to the head of a patient P. Referring now to FIGS. 11-13, the sensor portion 1126 includes a patient facing surface 1104 on which temperature sensors 1102 are mounted thereon. The patient facing surface 1104 is curved. For example, the patient facing surface 1104 is configured to curve about first and second convergence points 1136, 1138. Accordingly, the temperature sensors 1102 are configured to at least partially surround the patient P's facial profile when the housing 1118 is in close proximity with the patient P's face. The temperature sensors 1102 are infrared temperature sensors similar to the temperature sensors 102 described above.

The temperature sensors 1102 include at least a first set of temperature sensors 1102a and a second set of temperature sensors 1102b. The first set of temperature sensors 1102a are mounted on a first wing 1130 of the sensor portion 1126 and the second set of temperature sensors 1102b are mounted on a second wing 1132 of the sensor portion 1126.

The first set of temperature sensors 1102a are spaced apart on the first wing 1130 of the sensor portion 1126 and are each orientated to receive infrared radiation 1134 from the first convergence point 1136. The first convergence point 1136 can correspond to a first measurement site such as the inner-canthal region next to the patient P's right eye.

The second set of temperature sensors 1102b are spaced apart on the second wing 1132 of the sensor portion 1126 and are each orientated to receive infrared radiation 1134 from the second convergence point 1138. The second convergence point 1138 can correspond to a second measurement site such as the inner-canthal region next to the patient P's left eye. The first and second convergence points 1136, 1138 are symmetrical about a central axis 1140 that runs down the middle of the housing 1118 of the non-contact thermometer 1100.

Each temperature sensor 1102 collects temperature data as inputs for an algorithm stored in a memory of the non-contact thermometer 1100. In some examples, the algorithm identifies the highest measurement reading acquired by the first and second sets of temperature sensors 1102a, 1102b, and selects the highest measurement reading as an input to determine the patient P's temperature. In another example, the algorithm averages the measurement readings acquired by the first and second sets of temperature sensors 1102a, 1102b, and selects an average measurement reading as an input to determine the patient P's temperature. In some examples, the input measurement reading is correlated to a core body temperature using a lookup table stored in the memory of the non-contact thermometer 1100 to determine the patient P's temperature.

Figure 14:
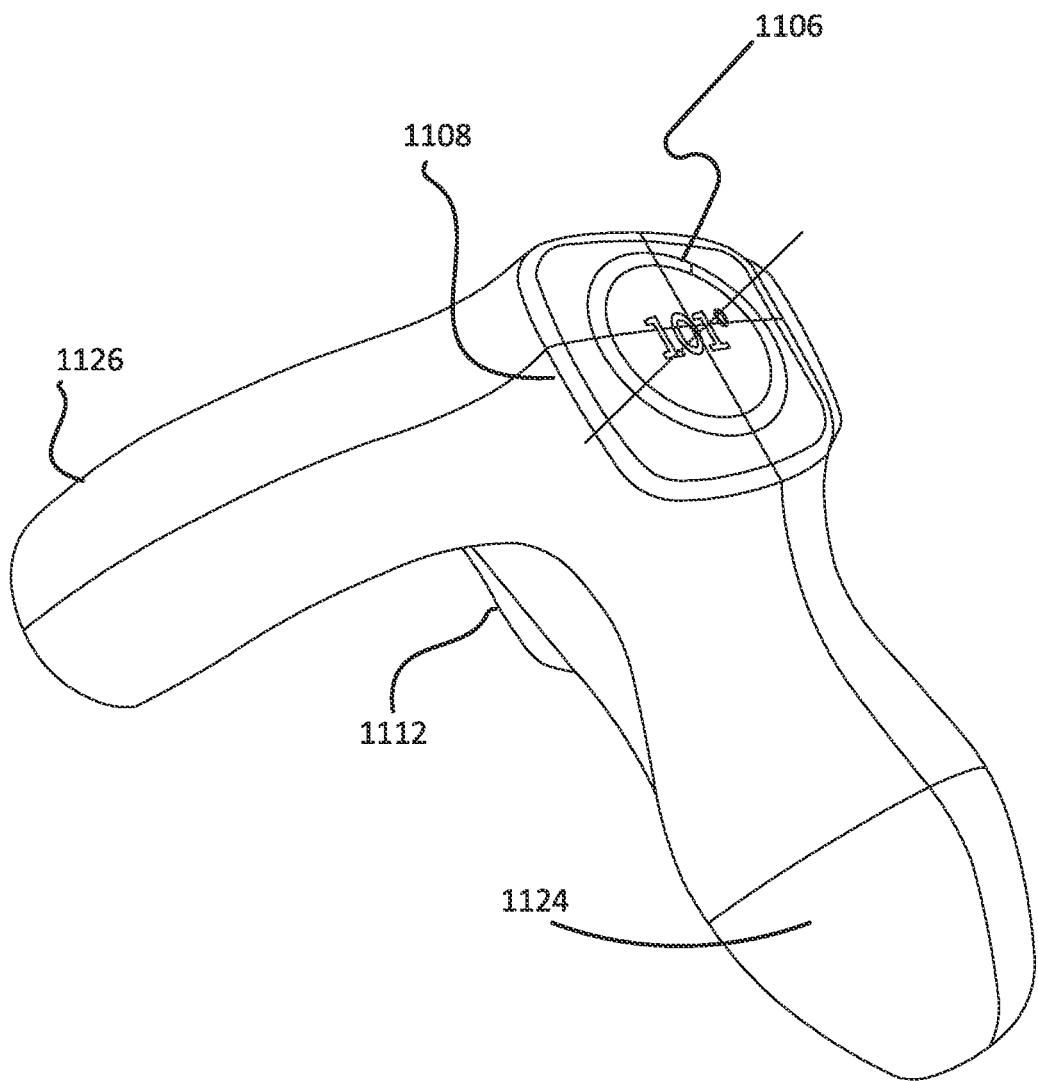
FIG. 14 is another isometric view of the example non-contact thermometer of FIG. 11 shown from the perspective of a clinician taking a temperature measurement.

As shown in FIG. 14, a display unit 1106 is mounted on a clinician facing surface 1108 that is opposite the patient facing surface 1104 on the housing 1118. The display unit 1106 faces a clinician while the clinician holds the handle portion 1124 to position the non-contact thermometer 1100 in proximity to the patient P's head for obtaining an estimate of the patient P's temperature. The display unit 1106 can display the temperature of the patient P. Additional information may be displayed on the display unit 106 as well.

As shown in FIGS. 11 and 12, the sensor portion 1126 can further include an imaging device 1116 that is similar to the imaging device 116 described above. As shown in FIG. 14, the imaging device 1116 can be used to generate an image of the patient P's facial profile on the display unit 1106. The image of the patient P's facial profile can be used to generate a viewfinder screen 1900 on the display unit 1106. The viewfinder screen 1900 includes an indicator such as an overlay on the image generated from the imaging device 1116 that can be used for positioning the non-contact thermometer 1100 with respect to the patient P's face so that the temperature sensors 1102 are properly aligned with measurement sites on the patient P's face. The viewfinder screen 1900 will be described in more detail with reference to FIG. 19.

Figure 15:
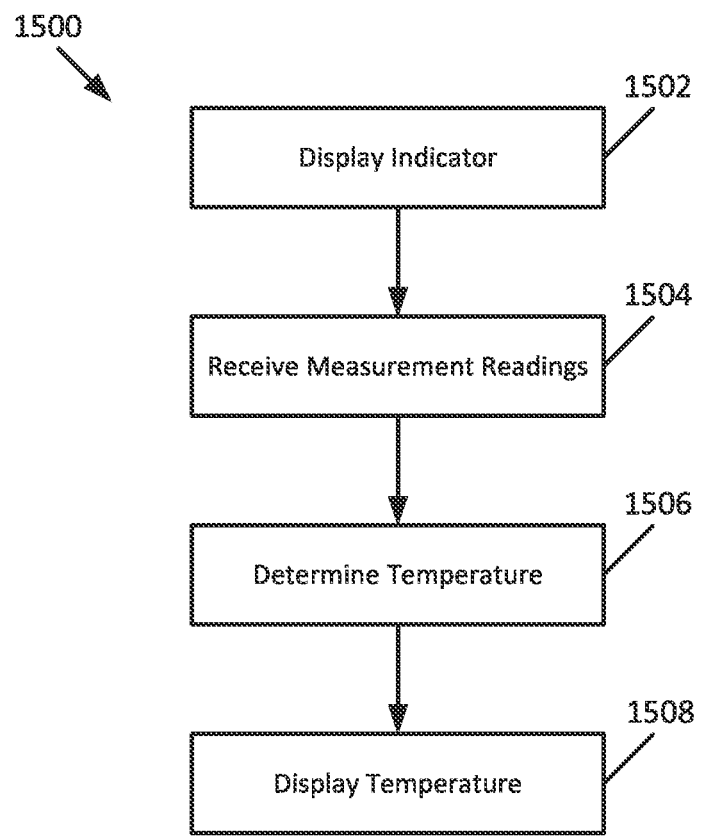
FIG. 15 illustrates a method of determining a temperature estimate using the example embodiments of the non-contact thermometer shown in FIGS. 11-14.

FIG. 15 illustrates a method 1500 of determining a temperature estimate using the non-contact thermometer 1100. The method 1500 includes an operation 1502 of displaying an indicator to assist alignment of temperature sensors with the first and second measurement sites. In some examples, the indicator is the viewfinder screen 1900 displayed on the display unit 1106 of the non-contact thermometer 1100, as shown in FIG. 13. The viewfinder screen 1900 includes an overlay of an image captured by the imaging device 1116, and displayed on the display unit 1106 that can be used by a clinician or user to properly align the one or more temperature sensors 1102 with desired measurement sites. In some examples, the viewfinder screen 1900 can be used to horizontally and vertically align the temperature sensors 1102a, 1102b with first and second measurement sites on the patient P's face. In certain examples, the first and second measurement sites are the left and right inner-canthal regions.

Next, the method 1500 includes an operation 1504 of receiving at least one measurement reading of the first and second measurement sites. The at least one measurement reading is received by non-contact temperature sensors such as the temperature sensors 1102a, 1102b described above. The non-contact temperature sensors can include infrared temperature sensors such as a thermopile or similar infrared-based temperature sensing device.

Next, the method 1500 includes an operation 1506 of determining a temperature based on the at least one measurement reading. Operation 1506 can be similar to operation 706 described above with respect to the method 700 of FIG. 7.

Next, the method 1500 includes an operation 1508 of displaying the temperature on a display unit of the non-contact thermometer. For example, the temperature can be displayed on the display unit 1106 shown in FIG. 14.

Figure 16:
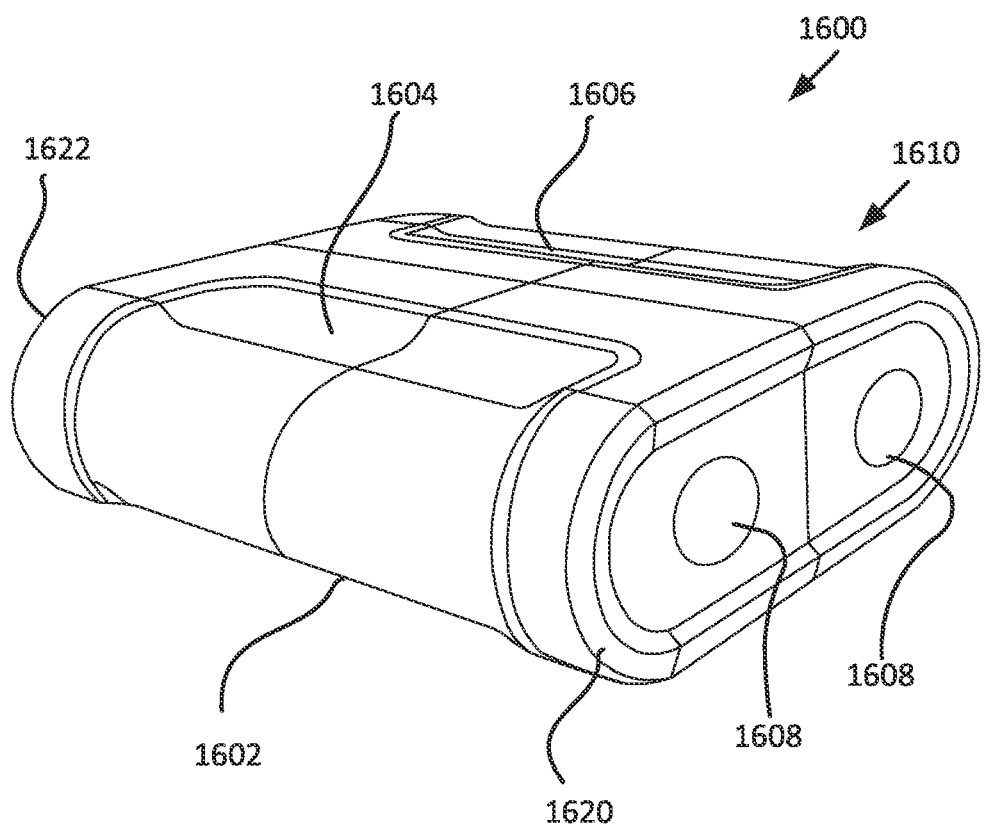
FIG. 16 is an isometric view of another example non-contact thermometer shown in a binocular configuration.
Figure 17:
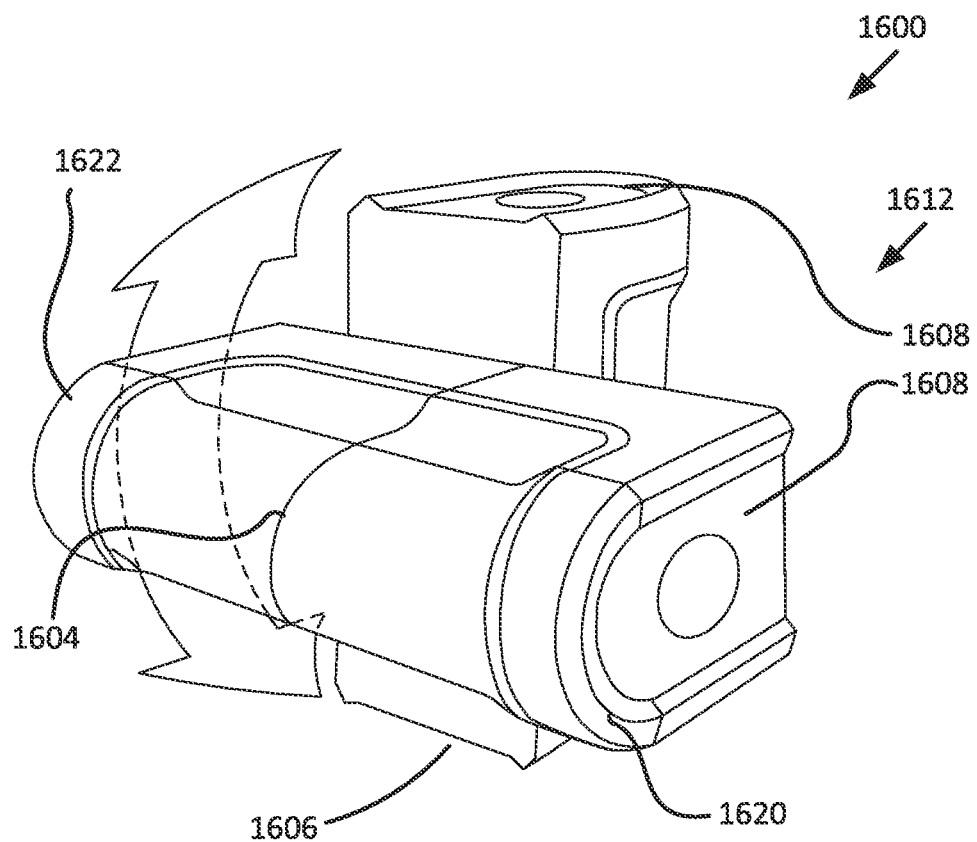
FIG. 17 is an isometric view of the example non-contact thermometer of FIG. 16 shown in a monocular configuration.

FIGS. 16 and 17 show a non-contact thermometer 1600 in accordance with another example embodiment. The non-contact thermometer 1600 has a housing 1602 with first and second portions 1604, 1606. The first and second portions 1604, 1606 each have a distal end 1620 for facing a patient and a proximal end 1622 for facing a clinician.

In some examples, an eye piece or display unit can be mounted on each proximal end 1622 of the first and second portions 1604, 1606 for viewing a facial profile of a patient, a viewfinder screen, or both a facial profile with a viewfinder screen overlayed on top thereof. In some examples, the eye piece or display unit can display the viewfinder screen 1900 like the one shown in FIG. 19. The viewfinder screen 1900 can be used by the clinician to assist horizontal and vertical alignment of one or more temperature sensors 1608 of the non-contact thermometer 1600 with one or more measurement sites for acquiring measurement readings that can be used by the non-contact thermometer 1600 to estimate a temperature of a patient.

At least one temperature sensor 1608 is mounted on each distal end 1620 of the first and second portions 1604, 1606. The temperature sensors 1608 on each distal end 1620 of the first and second portions 1604, 1606 is an infrared temperature sensor that collects infrared radiation from one or more measurement sites on a patient's face without contact.

In the example shown in FIG. 16, the first and second portions 1604, 1606 are substantially parallel with one another and the distal ends 1620 face in the same direction such that the non-contact thermometer 1600 is in a binocular configuration 1610. The binocular configuration 1610 is configured for use when the patient's face is in full view such that first and second measurement sites corresponding with left and right inner-canthal regions of the patient's face can be aligned with the temperature sensors 1608. When in the binocular configuration 1610, the non-contact thermometer 1600 can determine a temperature based on measurement readings from the first and second measurement sites.

FIG. 17 shows the non-contact thermometer 1600 in a monocular configuration 1612. The first and second portions 1604, 1606 are rotatable with respect to one another such that the non-contact thermometer 1600 can switch back and forth between the binocular and monocular configurations 1610, 1612. In some examples, the first and second portions 1604, 1606 are manually rotatable such that a clinician can use their hands to twist or rotate the housing 1602 between the binocular and monocular configurations 1610, 1612. In other examples, an electronic motor can be used to drive the housing 1602 between the binocular and monocular configurations 1610, 1612 upon activation of a switch by the user.

In the example shown in FIG. 17, the first and second portions 1604, 1606 are substantially orthogonal to one another when in the monocular configuration 1612 such that the first and second portions 1604, 1606 are rotated 90 degree with respect to one another. Alternatively, the first and second portions 1604, 1606 can be rotated 180 degree with respect to one another in the monocular configuration 1612 such that the distal end 1620 of the first portion 1604 faces in an opposite direction of the distal end 1620 of the second portion 1606.

In the monocular configuration 1612, the non-contact thermometer 1600 is adapted to estimate a temperature of a patient based on measurement readings from at least one measurement site. In some examples, the at least one measurement site is the left or right inner-canthal region of the patient's face. The monocular configuration 1612 can be used when the clinician is orthogonal to the patient such that the clinician can only view one side of the patient's face or when patient's face is partially covered such as when the patient is in bed on their side such that half of their face is covered by a pillow or a mattress.

The non-contact thermometer 1600 can automatically detect whether it is in the binocular configuration 1610 or in the monocular configuration 1612, and can appropriately adjust one or more mechanisms to estimate temperature. For example, the non-contact thermometer 1600 can adapt the operation of the temperature sensors 1608 on the distal ends 1620 and can also adapt the operation of the display units on the proximal ends 1622 based on whether the housing 1602 is detected to be in the binocular configuration 1610 or in the monocular configuration 1612. Additionally, the non-contact thermometer 1600 can also adapt one or more algorithms stored in a memory of the non-contact thermometer 1600 that are used to generate the temperature estimate based on whether the housing 1602 is detected to be in the binocular configuration 1610 or in the monocular configuration 1612.

Figure 18:
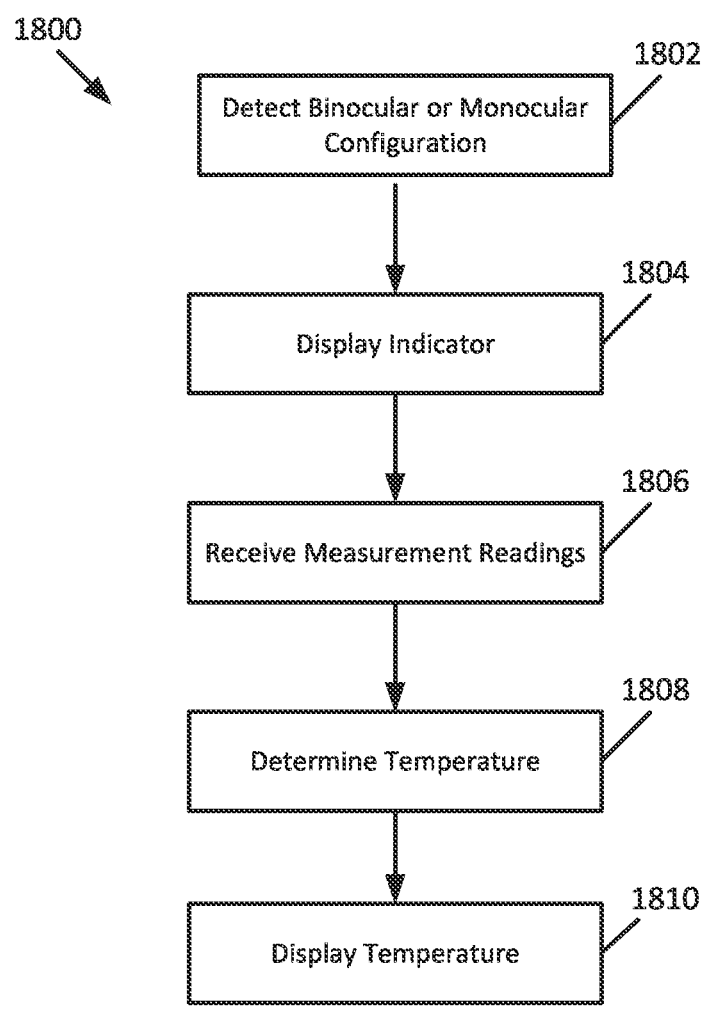
FIG. 18 illustrates a method of determining a temperature estimate using the example embodiments of the non-contact thermometer shown in FIGS. 16 and 17.

FIG. 18 illustrates a method 1800 of determining a temperature estimate using the non-contact thermometer 1600. The method 1800 includes an operation 1802 of detecting whether the housing 1602 is in the binocular configuration 1610 shown in FIG. 16 or the monocular configuration 1612 shown in FIG. 17. As described above, a clinician can adjust the housing 1602 based on whether both eyes of the patient can be viewed by the clinician such that it would be advantageous to use the binocular configuration 1610, or whether only one side of the patient's face can be viewed by the clinician such that it would be advantageous to use the monocular configuration 1612. As described above, the user can use their hands to twist or rotate the first and second portions 1604, 1606 of the housing 1602 to be in the binocular configuration 1610 or the monocular configuration 1612. Alternatively, the non-contact thermometer 1600 can include an electronic motor to drive the housing 1602 between the binocular and monocular configurations 1610, 1612 upon activation of a switch by the user.

In some examples, the method 1800 includes an operation 1804 of displaying an indicator to assist alignment of a temperature sensor 1608 with a measurement site on the patient's face when in the monocular configuration 1610, or to assist alignment of at least two temperature sensors 1608 with at least two measurement sites on the patient's face when in the binocular configuration 1610. As an illustrative example, the indicator can be the viewfinder screen 1900 shown in FIG. 19. The viewfinder screen 1900 can be viewed through the eye piece or display unit on the proximal ends 1622 of the first and second portions 1604, 1606. In some examples, the viewfinder screen 1900 can be adjusted based on whether the housing is detected to be in the binocular configuration 1610 or the monocular configuration 1612.

Next, the method 1800 includes an operation 1806 of receiving at least one measurement reading from the at least one measurement site. The at least one measurement reading is received by non-contact temperature sensors such as the temperature sensors 1608. The non-contact temperature sensors can include infrared temperature sensors such as a thermopile or similar infrared-based temperature sensing device. In certain examples, the at least one measurement site is the left or right inner-canthal region of the patient's face.

Next, the method 1800 includes an operation 1808 of determining a temperature based on the at least one measurement reading. Operation 1808 can be similar to operation 706 described above with respect to the method 700 of FIG. 7.

In some examples, the method 1800 includes a further operation 1810 of displaying the determined temperature on a display unit of the non-contact thermometer or elsewhere.

FIG. 19 illustrates an example of a viewfinder screen 1900. The viewfinder screen 1900 can be displayed on any of the display units described above of the various example embodiments of the non-contact thermometer. In one example, the viewfinder screen 1900 is displayed on the display unit 1106 of the non-contact thermometer 1100, as shown in FIG. 13.

The viewfinder screen 1900 is displayed for viewing by a clinician while the clinician uses a non-contact thermometer (in accordance with any of the example embodiments described above) to properly align the one or more temperature sensors with one or more measurement sites on the patient P's face. The viewfinder screen 1900 can help to improve the consistency and accuracy of the temperature estimates acquired from the non-contact thermometer.

In some examples, the viewfinder screen 1900 can include an image of the patient P's facial profile. The image can be generated by an imaging device such as the ones described above. The patient P's facial profile includes at least the patient P's nose and eyes. In other examples, the viewfinder screen 1900 does not include an image of the patient P's facial profile.

The viewfinder screen 1900 further includes a vertical line 1902 and a horizontal line 1904. The clinician uses the viewfinder screen 1900 to align the patient P's nose with the vertical line 1902 and to align the patient P's eyes with the horizontal line 1904 to properly align the temperature sensors of the non-contact thermometer with desired measurement sites on the patient P's face such as a first measurement site at the inner-canthal region next to the left eye, and a second measurement site at the inner-canthal region next to the right eye.

The viewfinder screen 1900 further includes a distance indicator 1908 that alerts the clinician when the non-contact thermometer is within a proper distance of the patient for obtaining accurate measurement readings. For example, the distance indicator 1908 can flash green when the non-contact thermometer is within the proper distance of the patient. In addition to the distance indicator 1908, the non-contact thermometer can also include an audio unit, such as the audio unit 108 described above, that generates an audio output to indicate that the non-contact thermometer is within a proper distance of the patient.

The distance indicator and/or the audio unit can also be used to indicate that the non-contact thermometer is properly aligned with one or more desired measurement sites on the patient's face, in addition to alerting the clinician that the non-contact thermometer is within a proper distance of the patient. For example, the distance indicator and/or the audio unit can generate a light or a sound to alert the clinician when the non-contact thermometer is both within an appropriate distance and properly aligned with the one or more desired measurement sites.

In situations where it is not possible for the clinician to be face-to-face with the patient such that it is not possible to align the vertical and horizontal lines 1902, 1904 with the patient's nose and eyes, respectively, the viewfinder screen 1900 includes a bullseye circle 1906 that the clinician can align with the left or right eye of the patient that is exposed. The bullseye circle 1906 is especially helpful for the non-contact thermometer 1600 shown in FIGS. 16 and 17 when it is in the monocular configuration 1612 for acquiring a temperature estimate based on at least one measurement site located in an inner-canthal region of the left or right eye.

The bullseye circle 1906 can be used by the clinician to properly align a temperature sensor with an inner-canthal region of the left or right eye when the clinician is perpendicular to the patient or is otherwise not orientated face-to-face with the patient. Thus, the viewfinder screen 1900 can be used to properly align the non-contact thermometer with an inner-canthal region of the patient's face regardless of the patient's orientation with respect to the clinician.

Additionally, the distance indicator 1908 can be used with the bullseye circle 1906 to alert the clinician that the non-contact thermometer is within a proper distance of the patient for obtaining accurate measurement readings. Also, the distance indicator and/or the audio unit can be used to indicate that the non-contact thermometer is properly aligned with the at least one measurement site located in an inner-canthal region of the left or right eye.

In some examples, the clinician can select or otherwise actuate a mechanical switch, such as the user controls 212, 1112 described above, to switch the non-contact thermometer between single eye and dual eye measurement modes. In alternative examples, the non-contact thermometer can automatically switch between single eye and dual eye measurement modes based on data acquired from one or more sensors such as from the imaging devices 116, 1116 that can detect whether a single eye or both eyes are in view of the non-contact thermometer.

In one example configuration, the viewfinder screen 1900 can be implemented on an electronic device such as a smartphone or tablet computer that has an imaging device such as a camera to visualize a patient's face and detect temperature. A clinician can use the viewfinder screen 1900 to appropriately aim the electronic device at the patient's face. The electronic device can use the imaging device to determine whether the patient's face is in full view or is partially covered. Thereafter, the electronic device can select an appropriate method to generate a temperature estimate based on measurement readings from one or more measurement sites on the patient's face. The one or more measurement sites can include a first measurement site located at the inner-canthal region next to the left eye of the patient, and a second measurement site located at the inner-canthal region next to the right eye of the patient.

Figure 20:
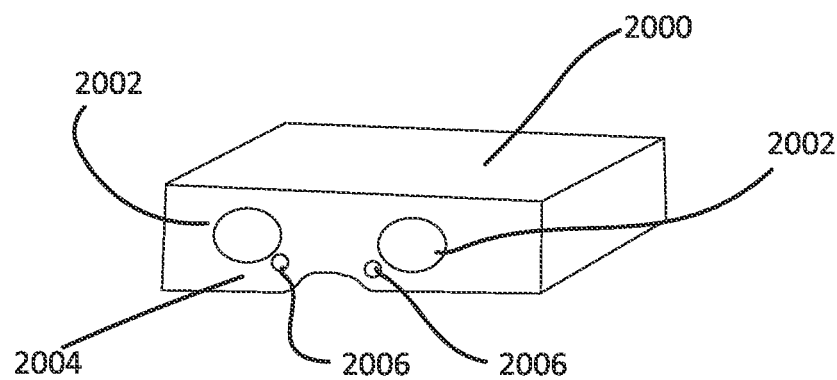
FIG. 20 illustrates a non-contact thermometer in accordance with another example embodiment of the present disclosure.
Figure 22:
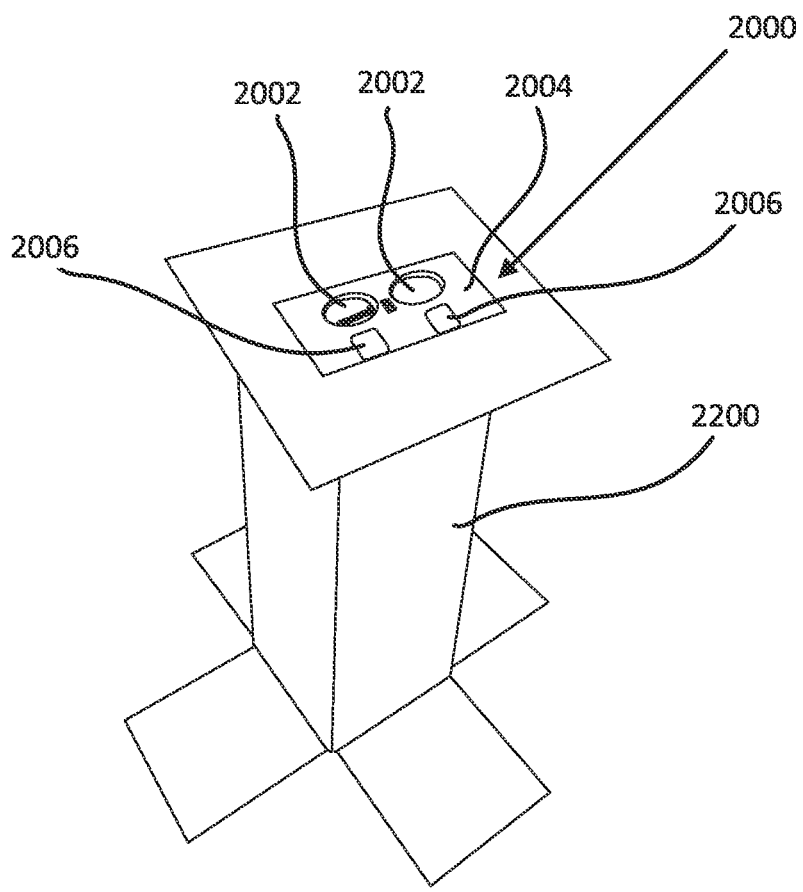
FIG. 22 shows the non-contact thermometer of FIG. 20 mounted on a pedestal.

FIG. 20 illustrates a non-contact thermometer 2000 in accordance with another example embodiment of the present disclosure. In some examples, the non-contact thermometer 2000 is part of a kiosk located at the entrance of a building, stadium, airport terminal, and the like. The non-contact thermometer 2000 can be used as an entry point screener for screening employees, visitors, customers, patrons, and the like. In some examples, the non-contact thermometer 2000 is mounted onto a pedestal 2200, as is shown in FIG. 22.

Figure 21:
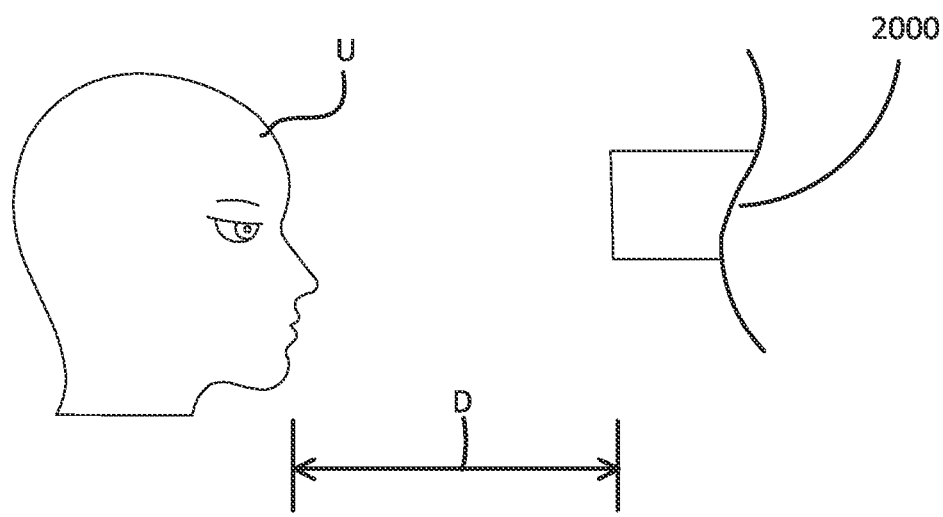
FIG. 21 shows a user positioned relative to the non-contact thermometer of FIG. 20.

FIG. 21 shows a user U positioned relative to the non-contact thermometer 2000 which is configured to be used by the user U without assistance from another person. The user U aligns their eyes with one or more apertures 2002 located on an exterior surface 2004 of the non-contact thermometer 2000, while positioning their face at a distance D away from the exterior surface 2004. As an example, the user U can position their face about 10 inches away from the exterior surface 2004 for obtaining accurate measurement readings.

The non-contact thermometer 2000 includes temperature sensors 2006 that are mounted on the exterior surface 2004 of the non-contact thermometer 2000. The temperature sensors 2006 are similar to the temperature sensors 102 described above. For example, the temperature sensors 2006 are infrared temperature sensors that collect radiation from one or more measurement sites on the user U's face. The temperature sensors 2006 can collect radiation from a first measurement site located at the inner-canthal region next to the left eye of the user U, and from a second measurement site located at the inner-canthal region next to the right eye of the user U. Each temperature sensor 2006 collects temperature data that can be used by an algorithm stored in a memory of the non-contact thermometer 2000 that identifies the most accurate temperature from the first and second measurement sites. The most accurate temperature can be identified as having the lowest amount of noise or error. In some examples, the most accurate temperature is selected for determining the user U's temperature. This can improve the accuracy of the estimate of the patient P's temperature.

FIG. 23 illustrates another example of a non-contact thermometer 2300 that incorporates a viewfinder screen 2302 to help users align their eyes with one or more temperature sensors 2304. The viewfinder screen 2302 is shown from the perspective of a patient or user receiving a temperature estimate from the non-contact thermometer 2300. While the viewfinder screen 2302 can be incorporated on any of the non-contact thermometers described above, the viewfinder screen 2302 is especially helpful in embodiments where the non-contact thermometer 2300 is an entry point screener for screening employees, visitors, customers, patrons, and the like. The viewfinder screen 2302 can help the employees, visitors, customers, patrons, and the like properly align one or more measurement sites on their face with temperature sensors 2304 mounted on an exterior surface 2306 of the non-contact thermometer 2300.

The exterior surface 2306 includes the temperature sensors 2304. The temperature sensors 2304 are each an infrared temperature sensor such as a thermopile or similar infrared-based temperature sensing device. The temperature sensors 2304 are each orientated at inward angles, and are configured to collect radiation from one or more measurement sites on the user's face such as the inner-canthal regions next to the left and right eyes.

The viewfinder screen 2302 displays one or more visual targets. The patient or user is instructed to align their eyes to see the one or more visual targets, which causes the patient or user to naturally align their face with the temperature sensors 2006, 2008. A properly aligned face facilitates obtaining measurement readings from desired measurement sites on the user's face such as the inner-canthal regions of the left and right eyes.

In some instances, an audio unit of the non-contact thermometer 2300, such as the audio unit 108 described above, generates the instructions for the user to align their eyes with the one or more visual targets. In some examples, the one or more visual targets are displayed for viewing by the user through video, illumination, or mirror techniques, or are simply created by one or more fixed targets that can be viewed by the patient or user.

In one illustrative example, the visual targets include first and second crosshair grids that each include a vertical line 2310, a horizontal line 2312, and/or a bullseye circle 2314. The first crosshair grid is positioned toward the front of the non-contact thermometer 2300 in closer proximity to the user, and the second crosshair grid is positioned toward the rear of the non-contact thermometer 2300 further away from the user. During use, the patient is instructed to visually align with their eyes the first and second crosshair grids such that they will naturally align the inner-canthal regions of their left and right eyes with the temperature sensors 2304 for obtaining measurement readings from these measurement sites.

In another illustrative example, the visual targets include an aperture 2308 that is centrally located on the exterior surface 2306 of the non-contact thermometer 2300. The aperture 2308 contains a central light pipe of a first color that is surrounded by a plurality of light pipes of a second color. As an example, the first color is green and the second color is red. When the user has not properly aligned their face with the temperature sensors 2304, they will visually see the second color (e.g., red) in the aperture 2308. When the user has properly aligned their face with the temperature sensors 2304, they will visually see the first color (e.g., green) in the aperture 2308. Thus, the aperture 2308 can be used to provide visual confirmation to the user so that they know whether they have properly aligned their face with the temperature sensors or not.

As a further example, a mirror can be positioned on the exterior surface 2306 between the temperature sensors 2304. When the user sees both of their eyes fill the mirror, the user's face is properly aligned with the temperature sensors 2304. As yet a further example, the mirror can have etched crosshairs for the user to align their nose with the vertical line and their eyes aligned with the horizontal line to properly align their face with the temperature sensors 2304.

In addition to displaying the one or more visual targets, the exterior surface 2306 can further include a distance indicator 2316 that alerts the user when they are within a proper distance of the non-contact thermometer 2300. For example, the distance indicator 2316, can flash green when the user is within the proper distance of the non-contact thermometer 2300 and can flash red when the user is not within the proper distance. Alternatively, or in addition to the distance indicator 2316, the non-contact thermometer 2300 can generate an audio output to audibly indicate when the user is within a proper distance of the non-contact thermometer 2300. In some examples, the distance indicator 2316 and/or the audio unit can also be used to indicate when the user has properly aligned their face with the temperature sensors 2304.

Figure 24:
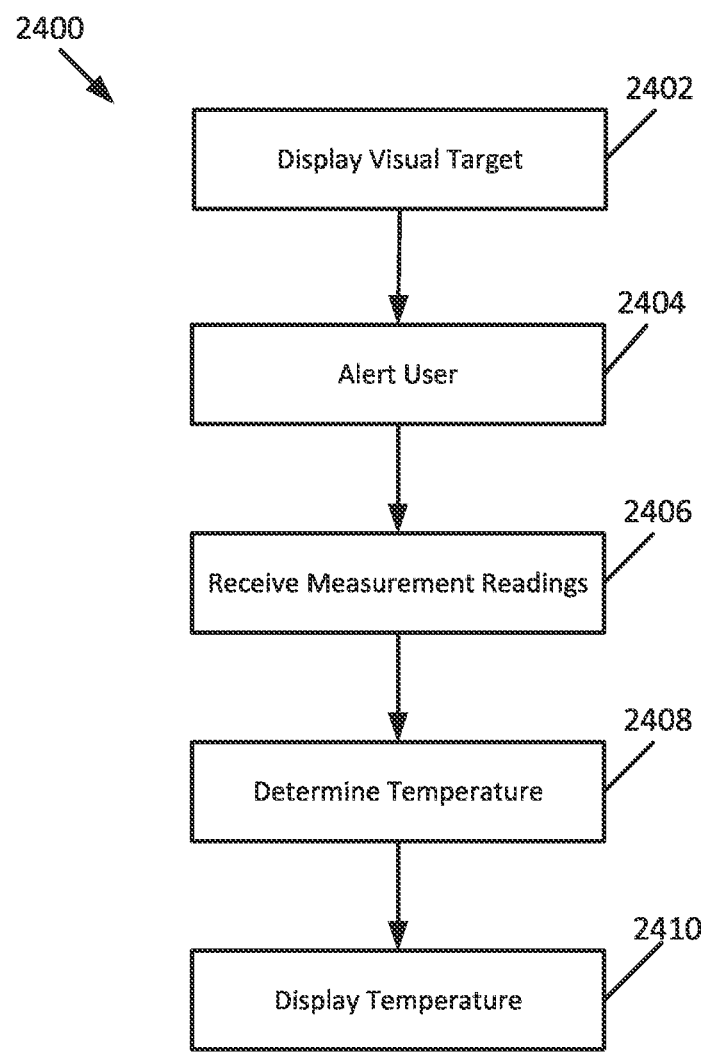
FIG. 24 illustrates a method of determining a temperature estimate using the example embodiments of the non-contact thermometer shown in FIGS. 20-23.

FIG. 24 illustrates a method 2400 of determining a temperature estimate using the non-contact thermometer 2300. The method 2400 includes an operation 2402 of displaying a visual target to assist a user to horizontally and vertically align one or more measurement sites on their face with one or more temperature sensors. In some examples the one or more measurement sites are the left and right inner-canthal regions on the user's face. In some examples, the visual target includes the first and second crosshair grids that are described above. In further examples, the visual target is the aperture 2308 that includes the light pipes described above. In yet further examples, the visual target is a mirror as described above.

Next, the method 2400 includes an operation 2404 of alerting the user when they have properly aligned their face with the one or more temperature sensors. In some examples, operation 2404 may also include alerting the user when they are within a proper distance of the non-contact thermometer 2000 such as by using the distance indicator 2316.

Next, the method 2400 includes an operation 2406 of receiving at least one measurement reading from the one or more measurement sites. The at least one measurement reading is received by non-contact temperature sensors such as the temperature sensors 2304 described above. The non-contact temperature sensors can include infrared temperature sensors such as a thermopile or similar infrared-based temperature sensing device.

Next, the method 2400 includes an operation 2408 of determining a temperature based on the at least one measurement reading. Operation 2408 can be similar to operation 706 described above with respect to the method 700 of FIG. 7.

In some examples, the method 2400 includes a further operation 2410 of displaying the determined temperature on a display unit of the non-contact thermometer or elsewhere.

Figure 25:
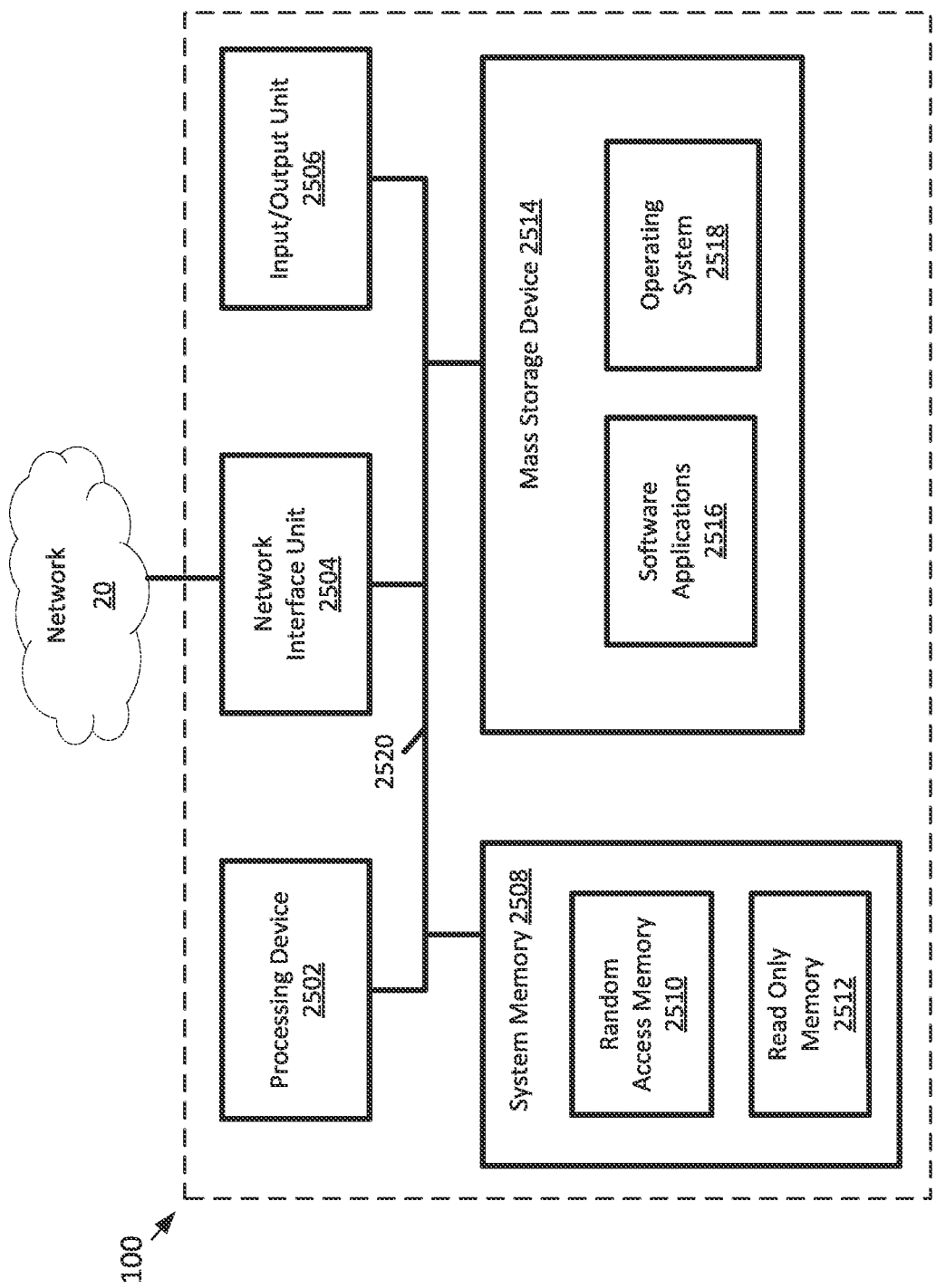
FIG. 25 schematically illustrates example computing components of the example embodiments of the non-contact thermometer of FIGS. 1-24.

FIG. 25 schematically illustrates example computing components in the embodiments of the non-contact thermometer described above. For illustrative purposes, FIG. 25 is described with respect to the non-contact thermometer 100 of FIG. 1. The non-contact thermometer 100 include a processing device 2502, a system memory 2508, and a system bus 2520 coupling the system memory 2508 to the processing device 2502. The processing device 2502 is an example of a processor such as a central processing unit (CPU). The processing device 2502 is operatively connected to the functional components of the non-contact thermometer 100.

The system memory 2508 is an example of a computer readable data storage device that stores software instructions that are executable by the processing device 2502. The system memory 2508 includes a random-access memory ("RAM") 2510 and a read-only memory ("ROM") 2512. Input/output logic containing the routines to transfer data between elements within the non-contact thermometer 100, such as during startup, is stored in the ROM 2512.

The non-contact thermometer 100 can also include a mass storage device 2514 that is able to store software instructions and data. The mass storage device 2514 is connected to the processing device 2502 through a mass storage controller (not shown) connected to the system bus 2520. The mass storage device 2514 and its associated computer-readable data storage medium provide non-volatile, non-transitory storage for the non-contact thermometer 100.

Although the description of computer-readable data storage media contained herein refers to a mass storage device, it should be appreciated by those skilled in the art that computer-readable data storage media can be any available non-transitory, physical device or article of manufacture from which the device can read data and/or instructions. The mass storage device 2514 is an example of a computer-readable storage device.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The non-contact thermometer 100 may operate in a networked environment using logical connections to remote network devices through the network 20. The non-contact thermometer 100 connects to the network 20 through a network interface unit 2504 connected to the system bus 2520. The network interface unit 2504 may also be utilized to connect to other types of networks and remote computing systems.

The non-contact thermometer 100 can also include an input/output controller 2506 for receiving and processing input from a number of input devices. Similarly, the input/output controller 2506 may provide output to a number of output devices.

The mass storage device 2514 and the RAM 2510 can store software instructions and data. The software instructions can include an operating system 2518 suitable for controlling the operation of the device. The mass storage device 2514 and/or the RAM 2510 also store software instructions 2516, that when executed by the processing device 2502, cause the device to provide the functionalities discussed in this document.

The various embodiments described above are provided by way of illustration only and should not be construed to be limiting in any way. Various modifications can be made to the embodiments described above without departing from the true spirit and scope of the disclosure.

What is claimed is:

1. A non-contact thermometer, comprising:
   a housing;
   a display unit coupled to the housing;
   an imaging device configured to generate an image of a facial profile for display on the display unit;
   one or more temperature sensors mounted on the housing, the one or more temperature sensors configured to determine a temperature of at least one measurement site without contact;
   at least one processing device operatively connected to the one or more temperature sensors and the display unit; and
   at least one computer readable data storage device storing software instructions that, when executed by the at least one processing device, cause the non-contact thermometer to:
      display an indicator to assist alignment of the one or more temperature sensors with the at least one measurement site, wherein the indicator is displayed on the display unit as a viewfinder screen overlayed on the facial profile, and wherein the viewfinder screen includes a vertical line and a horizontal line to assist moving the housing to both horizontally and vertically align the one or more temperature sensors with first and second measurement sites,
      wherein the vertical line is configured to align with a patient's nose shown on the facial profile of the display to assist moving the housing to horizontally align the one or more temperature sensors with the first and second measurement sites,
      wherein the horizontal line is configured to align with a patient's eyes shown on the facial profile of the display to assist moving the housing to vertically align the one or more temperature sensors with the first and second measurement sites, and
      wherein alignment of the patient's nose with the vertical line and the patient's eyes with the horizontal line improves an accuracy of temperature estimates acquired from the non-contact thermometer;
      receive at least one measurement reading from the at least one measurement site;
      determine a temperature based on the at least one measurement reading; and
      display the temperature on the display unit.

2. The non-contact thermometer of claim 1, further comprising an illumination unit configured to display the indicator as a beam of light projected onto the at least one measurement site.

3. The non-contact thermometer of claim 2, wherein the beam of light is projected as a line of latitude that extends across first and second measurement sites.

4. The non-contact thermometer of claim 3, wherein the first and second measurement sites are left and right innercanthal regions.

5. The non-contact thermometer of claim 1, wherein the housing has a patient facing surface on which the one or more temperature sensors are mounted, and the patient facing surface is curved.

6. The non-contact thermometer of claim 1, wherein a first set of temperature sensors are orientated to receive infrared radiation from a first convergence point corresponding to the first measurement site, and a second set of temperature sensors are orientated to receive infrared radiation from a second convergence point corresponding to the second measurement site.

7. The non-contact thermometer of claim 1, wherein the display unit is mounted on a clinician facing surface that is opposite a patient facing surface.

8. The non-contact thermometer of claim 1, wherein the housing includes first and second portions, the first portion being configured to be grasped by a hand, and the second portion being configured to rotate relative to the first portion; wherein the one or more temperature sensors are mounted on the second portion of the housing; and wherein the software instructions, when executed by the at least one processing device, further cause the non-contact thermometer to:
   rotate the second portion of the housing to scan the one or more temperature sensors across a facial profile that includes one or more measurement sites;
   receive measurement readings from the one or more temperature sensors; and
   determine a temperature based on the measurement readings.

9. The non-contact thermometer of claim 8, further comprising an illumination unit configured to project a beam of light to visually show a progress of the scan across the facial profile.

10. The non-contact thermometer of claim 8, wherein the one or more measurement sites include inner-canthal regions of the left and right eyes.

11. The non-contact thermometer of claim 1, wherein the housing has first and second portions that are configurable for rotation between binocular and monocular configurations;
wherein at least one temperature sensor is mounted on a distal end of the first portion and at least one temperature sensor is mounted on a distal end of the second portion; and
wherein the software instructions, when executed by the at least one processing device, further cause the non-contact thermometer to:
detect whether the first and second portions are in the binocular configuration or the monocular configuration;
receive measurement readings from the temperature sensors mounted on the distal ends of the first and second portions; and
determine the temperature based on at least the measurement readings and the detected configuration of the first and second portions.

12. The non-contact thermometer of claim 11, wherein the first and second portions are parallel in the binocular configuration, and wherein the first and second portions are orthogonal in the monocular configuration.

13. The non-contact thermometer of claim 11, wherein the binocular configuration enables the one or more temperature sensors to collect infrared radiation from first and second measurement sites that are spaced apart from one another.

14. The non-contact thermometer of claim 13, wherein the first and second measurement sites are inner-canthal regions of the left and right eyes.

15. The non-contact thermometer of claim 11, wherein the non-contact thermometer includes one or more algorithms stored in the at least one computer readable data storage device that are used to determine the temperature based on whether the housing is detected to be in the binocular configuration or in the monocular configuration.

\* \* \* \* \*